(12) United States Patent
Dong et al.

(10) Patent No.: US 11,777,397 B2
(45) Date of Patent: Oct. 3, 2023

(54) MULTILEVEL CONVERSION CIRCUIT HAVING FLYING CAPACITOR

(71) Applicant: Delta Electronics (Shanghai) Co.,Ltd., Shanghai (CN)

(72) Inventors: Kai Dong, Shanghai (CN); Yichao Wang, Shanghai (CN); Shuailin Du, Shanghai (CN); Jinfa Zhang, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 17/810,642

(22) Filed: Jul. 5, 2022

(65) Prior Publication Data
US 2023/0021124 A1 Jan. 19, 2023

(30) Foreign Application Priority Data

Jul. 15, 2021 (CN) .......................... 202110801795.6

(51) Int. Cl.
*H02M 1/00* (2006.01)
*H02M 7/483* (2007.01)
*H02M 1/32* (2007.01)
*H02M 7/06* (2006.01)

(52) U.S. Cl.
CPC .......... *H02M 1/0095* (2021.05); *H02M 1/32* (2013.01); *H02M 7/4837* (2021.05); *H02M 7/06* (2013.01)

(58) Field of Classification Search
None
See application file for complete search history.

(56) References Cited

U.S. PATENT DOCUMENTS

| 10,404,175 | B2 | 9/2019 | Chakraborty et al. |
| 10,536,073 | B2 * | 1/2020 | Young ..................... H02M 7/10 |
| 11,381,175 | B2 * | 7/2022 | Jang ..................... H02M 1/4233 |

FOREIGN PATENT DOCUMENTS

| CN | 107070277 B | 6/2019 |
| CN | 110545040 A | 12/2019 |

* cited by examiner

*Primary Examiner* — Jeffery S Zweizig
(74) *Attorney, Agent, or Firm* — CKC & Partners Co., LLC

(57) ABSTRACT

A multilevel conversion circuit having a flying capacitor is provided, including: a first bridge arm; a second bridge arm including a flying capacitor, the midpoints of the second and first bridge arms connected to a series branch defined by a first current limiting circuit, a power supply and an inductor; a DC bus capacitor connected in parallel to the first and second bridge arms; a rectifier circuit having an input end coupled to the power supply and an output end connected to a first auxiliary power supply; and a controller coupled to the first auxiliary power supply and the plurality of switches of the second bridge arm to control corresponding switches of the second bridge arm, the power supply charges the flying capacitor through the corresponding switches of the first and second bridge arms and the first current limiting circuit.

24 Claims, 12 Drawing Sheets

MULTILEVEL CONVERSION CIRCUIT HAVING FLYING CAPACITOR

CROSS-REFERENCE TO RELATED APPLICATIONS

This non-provisional application claims priority under 35 U.S.C. § 119(a) on Patent Applications No. 202110801795.6 filed on Jul. 15, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The invention relates to the field of power electronic technology, and particularly to a multilevel conversion circuit having a flying capacitor.

BACKGROUND

As for Power Factor Correction (PFC) circuits, firstly, a DC bus capacitor is charged by use of the switches of the PFC circuit after the circuit is powered on, and then an auxiliary power supply which is electrically connected to the DC bus capacitor starts to operate so as to provide the work supply for the controller if the DC bus voltage reaches a preset value, and finally the PFC circuit begins to work in normal operation.

When the PFC circuit uses a multilevel conversion circuit with a flying capacitor, the main power switches is typically selected from those switches with a lower breakdown voltage. During the charging for the DC bus capacitor, the flying capacitor, the switches at an outer side thereof and the DC bus capacitor form a loop, and since a voltage across the flying capacitor is zero, the voltage across the DC bus capacitor will be applied to the switches at the outer side of the flying capacitor, such that the switches at the outer side of the flying capacitor have a risk of damage. In addition, after the multilevel conversion circuit begins to normally operate, the controller may turn on or turn off the switches and charge the flying capacitor. Because an initial voltage of the flying capacitor is zero, when the controller turns on one switch at the outer side of the flying capacitor, the DC bus voltage will be completely applied to another switch at the outer side of the flying capacitor, so the switch may have a high risk of damage. Therefore, when the multilevel conversion circuit with a flying capacitor is used, the switches at the outer side of the flying capacitor must be protected before the controller operates, and the flying capacitor needs to be pre-charged before the multilevel conversion circuit having a flying capacitor normally operates, thereby preventing over-voltage damage of the switches at the outer side of the flying capacitor, and ensuring normal operation of the multilevel conversion circuit.

SUMMARY

To realize the above object, according to one embodiment of the invention, the disclosure provides a multilevel conversion circuit having a flying capacitor, including: a first bridge arm including a plurality of switches connected in series; a second bridge arm including a flying capacitor and a plurality of switches connected in series, a midpoint of the second bridge arm and a midpoint of the first bridge arm are connected to a first series branch defined by a first current limiting circuit, a power supply and an inductor; a DC bus capacitor connected in parallel to the first bridge arm and the second bridge arm; a rectifier circuit having an input end coupled to the power supply; a first auxiliary power supply having an input end coupled to an output end of the rectifier circuit; and a controller coupled to the first auxiliary power supply and the plurality of switches of the second bridge arm; wherein after the controller is activated, the controller is configured to control the corresponding switches of the second bridge arm to turn on, and the power supply charges the flying capacitor through the corresponding switches of the first bridge arm, the corresponding switches of the second bridge arm and the first current limiting circuit.

Based on the above, the disclosure allows the power supply to have corresponding technical characteristics by establishing independent power supply loops for the auxiliary power supply, avoids a risk of damage of the switches due to overvoltage before the controller is activated, the charging loops of the flying capacitor and the DC bus capacitor can be reliably cut off in a fault state, and conduct the first current limiting circuit after the fault is resolved, thereby improving fault response capability of the multilevel conversion circuit.

The disclosure provides a multilevel conversion circuit having a flying capacitor, and after the power supply is powered on, electric energy may be supplied to the first auxiliary power supply through the rectifier circuit to establish an operating voltage for supplying electric energy to the controller. After the controller begins to operate, the controller controls the corresponding switches of the second bridge arm to turn on, the charging loops of the flying capacitor and the DC bus capacitor are established. Since the initial voltage of the flying capacitor and the initial voltage of the DC bus capacitor are zero before the controller is activated, when the power supply charges the DC bus capacitor and the flying capacitor, the two switches connected in series at the outer side of the flying capacitor would not be damaged due to overvoltage. Further, the first auxiliary power supply is connected in parallel to the DC bus capacitor through the diodes, and when the voltage of the DC bus capacitor is higher than the output voltage of the rectifier circuit, the DC bus capacitor powers the first auxiliary power supply through the diodes. The auxiliary power supply also can include a second auxiliary power supply coupled in parallel to both ends of the DC bus capacitor, and has a larger output power for supplying electric energy to the multilevel conversion circuit after the multilevel conversion circuit normally operates. Moreover, the first auxiliary power supply is coupled to an output end of the rectifier circuit as an auxiliary power supply independent of the multilevel conversion circuit, the first auxiliary power supply has a smaller output power mainly for supplying electric energy to the controller in the process of charging the flying capacitor and the DC bus capacitor when the multilevel conversion circuit occurs a fault. In addition, the charging loops of the flying capacitor and the DC bus capacitor also can be reliably cut off in a fault state, and the first current limiting circuit is conducted after the fault is resolved, thereby improving fault response capability of the multilevel conversion circuit.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in details with reference to the accompanying drawings, through which the above and other features and advantages of the invention will become more apparent.

DETAILED DESCRIPTION

Figure 1:
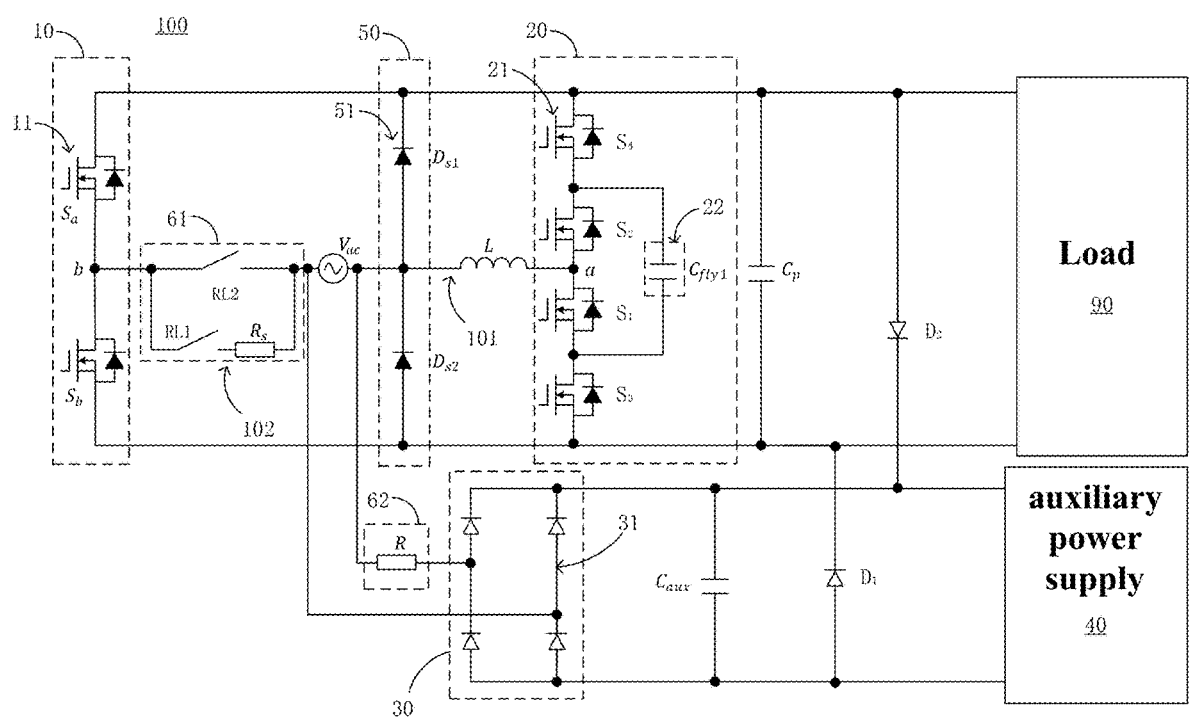
FIG. 1 is a three-level conversion circuit having a flying capacitor according to a first embodiment of the invention.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

As shown in FIG. 1, it illustrates a circuit of a multilevel conversion circuit 100 having a flying capacitor according to one embodiment of the invention. It shall be noted that a three-level conversion circuit is taken as an example in the embodiment of FIG. 1, but the invention is not limited thereto. In the embodiment, the multilevel conversion circuit 100 may include a first bridge arm 10, a second bridge arm 20, a DC bus capacitor $C_p$, a rectifier circuit 30, an auxiliary power supply 40 and a controller (not shown). The first bridge arm 10 may include a plurality of switches 11 connected in series, and the second bridge arm 20 may include a plurality of switches 21 connected in series and a flying capacitor 22. Moreover, a midpoint a of the second bridge arm 20 and a midpoint b of the first bridge arm 10 are connected to a first series branch 101, and the first series branch 101 is defined by a first current limiting circuit 61, a power supply $V_{ac}$ and an inductor L. The DC bus capacitor $C_p$ is connected in parallel to the first bridge arm 10 and the second bridge arm 20, the rectifier circuit 30 has an input end coupled to the power supply $V_{ac}$, and the auxiliary power supply 40 has an input end coupled to an output end of the rectifier circuit 30. The controller is coupled to an output end of the auxiliary power supply 40 and the plurality of switches 21 of the second bridge arm 20. The switches 11 may include diodes, or controllable switches with anti-paralleled diode, and the switches 21 may include controllable switches with anti-paralleled diode. In some embodiments, the controller is connected to control terminals of the controllable switches, and the controller is configured to control turn on or turn off of the switches. Specifically, the controller is configured to control turn on or turn off of the controllable switches in the switches. For example, when the plurality of switches 11 of the first bridge arm 10 include controllable switches with anti-paralleled diode, the controller may be further connected to the control terminals of the controllable switches in the plurality of switches 11 for controlling turn on or turn off the plurality of switches 11.

After the power supply $V_{ac}$ is powered on, electric energy may be supplied to the auxiliary power supply 40 through the rectifier circuit 30, such that the auxiliary power supply 40 establishes a voltage, and is configured to supply electric energy to the controller. Before the controller is activated, the first current limiting circuit 61 is disabled. After the controller is activated, the controller is configured to control the corresponding switches 21 of the second bridge arm 20 to turn on, and then the first current limiting circuit 61 is conducted, such that the power supply $V_{ac}$ may charge the flying capacitor 22 through the corresponding switches 11 of the first bridge arm 10, the first current limiting circuit 61 and the corresponding switches 21 of the second bridge arm 20. And the power supply $V_{ac}$ may further charge the DC bus capacitor $C_p$ through the corresponding switches 11 of the first bridge arm 10, the first current limiting circuit 61 and the corresponding switches 21 of the second bridge arm 20. At this time, initial voltage of the flying capacitor 22 and initial voltage of the DC bus capacitor $C_p$ are zero, and the switches $S_4$ and $S_3$ connected in series at an outer side of the flying capacitor 22 are not subject to a risk of damage due to overvoltage. It shall be noted that enabling the first current limiting circuit 61 means that the first current limiting circuit 61 can provide a current flow path.

If the first current limiting circuit 61 is firstly conducted before the controller controls the corresponding switches 21 of the second bridge arm 20 to turn on, the power supply $V_{ac}$ may charge the DC bus capacitor $C_p$ through the corresponding switches 11 of the first bridge arm 10, the first current limiting circuit 61 and the corresponding switches 21 of the second bridge arm 20. At this time, if switching speed of the switches 21 of the second bridge arm 20 controlled by the controller is slow, the switches $S_4$ and $S_3$ connected in series at the outer side of the flying capacitor 22 may be damaged due to overvoltage.

In some other embodiments, if a voltage of the DC bus capacitor $C_p$ can be ensured not to exceed a preset voltage value before the controller controls the corresponding switches 21 of the second bridge arm 20 to turn on, the first current limiting circuit 61 may be firstly conducted, and then the controller controls the corresponding switches 21 of the second bridge arm 20 to turn on. At this time, the power supply $V_{ac}$ firstly charges the DC bus capacitor $C_p$ through the corresponding switches 11 of the first bridge arm 10, the first current limiting circuit 61 and the corresponding switches 21 of the second bridge arm 20, and then the power supply $V_{ac}$ further charges the flying capacitor 22 through the corresponding switches 11 of the first bridge arm 10, the first current limiting circuit 61 and the corresponding switches 21 of the second bridge arm 20.

In some embodiments, the first current limiting circuit 61 can be conducted before or after the corresponding switches 21 of the second bridge arm 20 are turned on. However, during the process of charging the flying capacitor and the DC bus capacitor, the first current limiting circuit 61 must be conducted to provide a current flow path.

In the embodiment of the three-level conversion circuit of FIG. 1, the number of the plurality of switches 11 of the first bridge arm 10 may be two, for example, a switching device $S_a$ and a switching device $S_b$. The number of the plurality of switches 21 of the second bridge arm 20 may be four, for example, a first switching device $S_4$, a second switching device $S_2$, a third switching device $S_1$ and a fourth switching device $S_3$. The flying capacitor 22, for example, includes one flying capacitor $C_{fly1}$ between the first switching device $S_4$ and the fourth switching device $S_3$. The rectifier circuit 30, for example, may include a diode rectifier bridge 31. A capacitor $C_{aux}$ may be further connected in parallel between the input end of the auxiliary power supply 40 and the output end of the rectifier circuit 30. A load 90 may be coupled to an output end of the DC bus capacitor $C_p$.

In some embodiments, after the first current limiting circuit 61 is conducted, when a voltage of the flying capacitor $C_{fly1}$ reaches a first preset value, the flying capacitor $C_{fly1}$ completes charging, the controller may be configured to control the corresponding switches 21 of the second bridge arm 20 to turn off, and the power supply $V_{ac}$ continues to charge the DC bus capacitor $C_p$. When a voltage of the DC bus capacitor $C_p$ reaches a second preset value, the DC bus capacitor $C_p$ completes charging. In some embodiments, since the device and the line have a voltage drop, the second preset value is slightly less than a voltage peak value $V_{ab\_peak}$ between the midpoint b of the first bridge arm 10 and the midpoint a of the second bridge arm 20.

In some embodiments, the first preset value is a half of the second preset value.

In some embodiments, before the controller is activated, initial voltage of the flying capacitor 22 and initial voltage of the DC bus capacitor $C_p$ are zero.

In some embodiments, the input end of the auxiliary power supply 40 is connected in parallel to the DC bus capacitor $C_p$ through anti-reverse diodes $D_1$ and $D_2$. When the DC bus capacitor $C_p$ and the flying capacitor 22 of the three-level conversion circuit complete charging, the three-level conversion circuit normally operates. At this time, if a voltage of the DC bus capacitor $C_p$ is greater than an output voltage of the rectifier circuit 30, the auxiliary power supply 40 may be powered by the DC bus capacitor $C_p$.

In some embodiments, the multilevel conversion circuit 100 may further include a third bridge arm 50. The third bridge arm 50 includes a plurality of switches 51 connected in series. In some embodiments, the switches 51 may be, but not limited to diodes. The third bridge arm 50 is connected in parallel to the first bridge arm 10, and a midpoint of the third bridge arm 50 is connected to the first series branch 101, for example, between the power supply $V_{ac}$ and the inductor L. The controller may control the corresponding switches 21 of the second bridge arm 20 to turn on. The corresponding switches 21 of the second bridge arm 20, the flying capacitor 22, the corresponding switches 11 of the first bridge arm 10, the power supply $V_{ac}$ and the inductor L form a charging loop for charging the flying capacitor 22, i.e., the power supply $V_{ac}$ may charge the flying capacitor 22 through the inductor L, the corresponding switches 21 of the second bridge arm 20, the corresponding switches 11 of the first bridge arm 10 and the first current limiting circuit 61. Alternatively, the corresponding switches 21 of the second bridge arm 20, the flying capacitor 22, the corresponding switches 11 of the first bridge arm 10, the power supply $V_{ac}$ and the corresponding switches 51 of the third bridge arm 50 form a charging loop for charging the flying capacitor 22, i.e., the power supply $V_{ac}$ may charge the flying capacitor 22 through the corresponding switches 21 of the second bridge arm 20, the corresponding switches 11 of the first bridge arm 10, the first current limiting circuit 61 and the corresponding switches 51 of the third bridge arm 50.

In some embodiments, when the first current limiting circuit 61 is conducted, the corresponding switches 11 of the first bridge arm 10, the first current limiting circuit 61, the power supply $V_{ac}$, the inductor L, the corresponding switches 21 of the second bridge arm 20 and the DC bus capacitor $C_p$ form a charging loop for charging the DC bus capacitor $C_p$, i.e., the power supply $V_{ac}$ may further charge the DC bus capacitor $C_p$ through the inductor L, the corresponding switches 11 of the first bridge arm 10, the first current limiting circuit 61, and the corresponding switches 21 of the second bridge arm 20. Additionally or alternatively, the corresponding switches 11 of the first bridge arm 10, the first current limiting circuit 61, the power supply $V_{ac}$, the corresponding switches 51 of the third bridge arm 50 and the DC bus capacitor $C_p$ form a charging loop for charging the DC bus capacitor $C_p$, i.e., the power supply $V_{ac}$ may further charge the DC bus capacitor $C_p$ through the corresponding switches 11 of the first bridge arm 10, the first current limiting circuit 61 and the corresponding switches 51 of the third bridge arm 50. Selection of the charging loop for the DC bus capacitor $C_p$ depends on a voltage drop of the charging loop. For example, if a voltage drop of the diodes $D_{S1}$ and $D_{S2}$ is 2V, and a voltage drop of the diodes in the switches is 0.7V, when the first current limiting circuit 61 is conducted, a charging loop is formed by the corresponding switches of the first bridge arm 10 and the corresponding switches of the second bridge arm 20. Then when the switches of the second bridge arm 20 uses GaN device, since a voltage drop of the equivalent body diodes of the GaN device is associated with a current flowing the same, after the first current limiting circuit 61 is conducted, a charging loop is formed by the corresponding switches of the first bridge arm 10 and the corresponding switches of the third bridge arm 50.

In some embodiments, in the charging loop for the flying capacitor and the charging loop for the DC bus capacitor, the current flows the corresponding diodes, or the diodes and the controllable switches.

In some embodiments, the first current limiting circuit 61 may include a first switch RL1, a second switch RL2 and a soft-start resistor $R_s$, and the first switch RL1 and the soft-start resistor $R_s$ are connected in series to form a second series branch 102, and the second switch RL2 and the second series branch 102 are connected in parallel. In the embodiment, the multilevel conversion circuit 100 may further include a second current limiting circuit 62 connected between an input end of the rectifier circuit 30 and the power supply $V_{ac}$. The second current limiting circuit 62, for example, may include a current limiting resistor R connected to the diode rectifier bridge of the rectifier circuit 30 and the power supply $V_{ac}$. The power supply $V_{ac}$ may firstly charge the DC bus capacitor $C_{aux}$ through the current limiting resistor R and the rectifier bridge 31 to power the auxiliary power supply 40.

Figure 12:
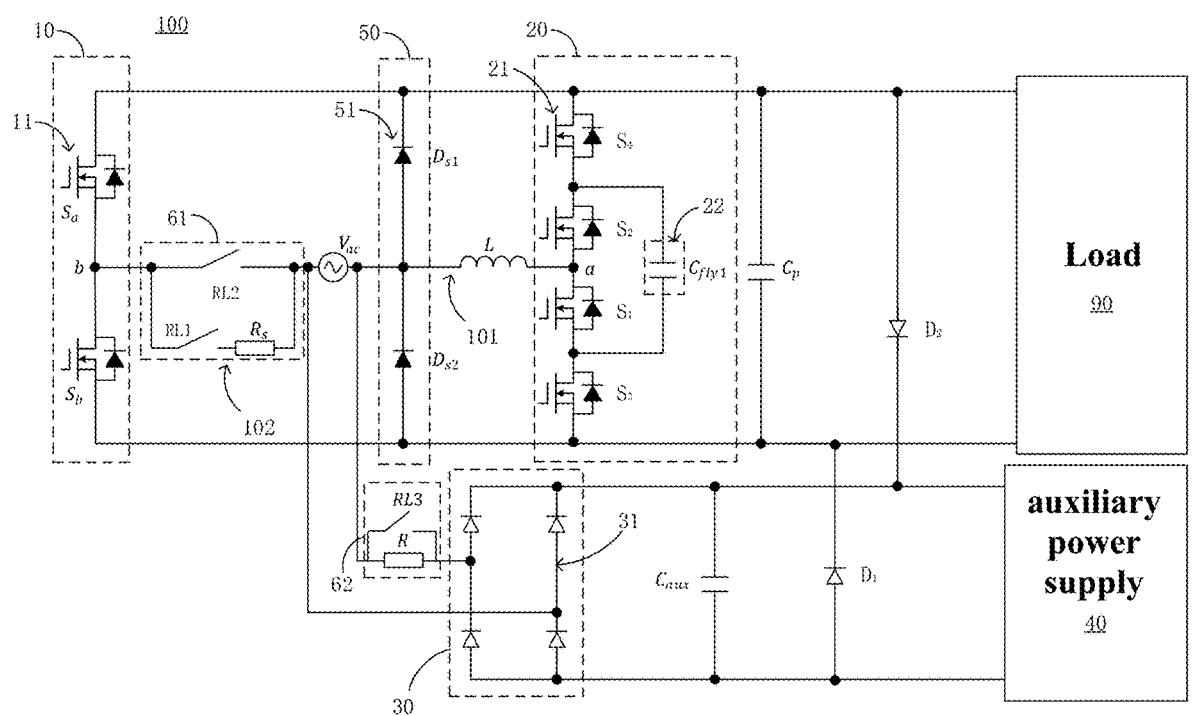
FIG. 12 is a three-level conversion circuit having a flying capacitor according to another embodiment of the invention.

In some other embodiments, as shown in FIG. 12, the second current limiting circuit 62 may further include a current limiting resistor R and a third switch RL3. The third switch RL3 is connected in parallel to the current limiting resistor R. Before the controller is activated, the third switch RL3 is turned off, and the power supply $V_{ac}$ may firstly charge the DC bus capacitor $C_{aux}$ through the current limiting resistor R and the rectifier bridge 31 to power the auxiliary power supply 40. After the controller is activated, the third switch RL3 is turned on, and the power supply $V_{ac}$ may firstly charge the DC bus capacitor $C_{aux}$ through the third switch RL3 and the rectifier bridge 31 to reduce loss of the circuit. In some embodiments, the third switch RL3 can be controlled by the controller, or other control devices to be turned on or turned off.

In some embodiments, when the multilevel conversion circuit occurs a fault, the third switch RL3 is turned off.

In some embodiments, before the controller is activated, both the first switch RL1 and the second switch RL2 are turned off, such that the first current limiting circuit 61 is disabled. That is, in the charging loop for the flying capacitor 22 and the charging loop for the DC bus capacitor, the first current limiting circuit 61 blocks the flow path of the current.

After the controller is activated, and configured to control the corresponding switches of the second bridge arm 20 to turn on, the first switch RL1 is turned on, such that the first current limiting circuit 61 is conducted. At this time, in the charging loop for the flying capacitor 22 and the charging loop for the DC bus capacitor, the first switch RL1 and the soft-start resistor $R_s$ of the first current limiting circuit 61 provide a flow path of the current. Specifically, the power supply $V_{ac}$ may charge the flying capacitor 22 through the corresponding switches 11 of the first bridge arm 10, the soft-start resistor $R_s$, the inductor L and the corresponding switches 21 of the second bridge arm 20. Alternatively, the power supply $V_{ac}$ may charge the flying capacitor 22 through the corresponding switches 21 of the second bridge arm 20, the corresponding switches 11 of the first bridge arm 10, the soft-start resistor $R_s$, and the corresponding switches 51 of the third bridge arm 50. Meanwhile, the power supply $V_{ac}$ may further charge the DC bus capacitor $C_p$ through the corresponding switches 11 of the first bridge arm 10, the soft-start resistor $R_s$, the inductor L and the corresponding switches 21 of the second bridge arm 20. Additionally or alternatively, the power supply $V_{ac}$ may further charge the DC bus capacitor $C_p$ through the corresponding switches 11 of the first bridge arm 10, the soft-start resistor $R_s$, and the corresponding switches 51 of the third bridge arm 50.

In some other embodiments, the first switch RL1 is firstly turned on, then the controller controls the corresponding switches of the second bridge arm 20 to turn on, and the power supply $V_{ac}$ may charge the DC bus capacitor $C_p$ through the corresponding switches 11 of the first bridge arm 10, the soft-start resistor $R_s$, the inductor L and the corresponding switches 21 of the second bridge arm 20. Additionally or alternatively, the power supply $V_{ac}$ may further charge the DC bus capacitor $C_p$ through the corresponding switches 11 of the first bridge arm 10, the soft-start resistor $R_s$, and the corresponding switches 51 of the third bridge arm 50. Meanwhile, the power supply $V_{ac}$ charges the flying capacitor 22 through the corresponding switches 11 of the first bridge arm 10, the soft-start resistor $R_s$, the inductor L and the corresponding switches 21 of the second bridge arm 20, or the power supply $V_{ac}$ may charge the flying capacitor 22 through the corresponding switches 21 of the second bridge arm 20, the corresponding switches 11 of the first bridge arm 10, the soft-start resistor $R_s$, and the corresponding switches 51 of the third bridge arm 50.

When the multilevel conversion circuit occurs a fault, the first switch RL1 and the second switch RL2 are turned off.

When a voltage of the DC bus capacitor $C_p$ reaches a second preset value, the controller may control all switches 21 of the second bridge arm 20 to turn off, the first switch RL1 to turn off, and the second switch RL2 to turn on, such that the multilevel conversion circuit normally operates.

In some embodiments, the first switch RL1 and the second switch RL2 can be controlled by the controller, or other control devices to be turned on or turned off.

Hereinafter the principle of the disclosure is described and explained in details with reference to the three-level conversion circuit having a flying capacitor shown in FIG. 1.

As shown in FIG. 1, it illustrates a flying-capacitor clamped three-level conversion circuit. After the power supply $V_{ac}$ is powered on, since the first switch RL1 and the second switch RL2 are turned off, voltage of the flying capacitor 22 and voltage of the DC bus capacitor $C_p$ are zero, and the uncontrolled rectifier bridge 31 is coupled to the power supply $V_{ac}$ so as to rectify the power supply $V_{ac}$ to a DC voltage, and the DC voltage is applied to the capacitor $C_{aux}$ for powering the auxiliary power supply 40. The auxiliary power supply 40 is activated, and outputs an auxiliary voltage for powering the controller, such that the controller is activated. After the controller is activated, the controller controls the corresponding switches 21 of the second bridge arm 20 to turn on, and optionally controls the corresponding switches 11 of the first bridge arm 10 to turn on. The first switch RL1 can be turned on before or after the corresponding switches 21 of the second bridge arm 20 are turned on, but during the process of charging the flying capacitor and the DC bus capacitor, the first switch RL1 must be turned on. The power supply $V_{ac}$ charges the flying capacitor 22 and the DC bus capacitor $C_p$ through the soft-start resistor $R_s$, the switches 11 of the first bridge arm 10 and the switches 21 of the second bridge arm 20, and the charging loops within positive and negative half periods are shown in FIGS. 2A and 2B.

Figure 2A:
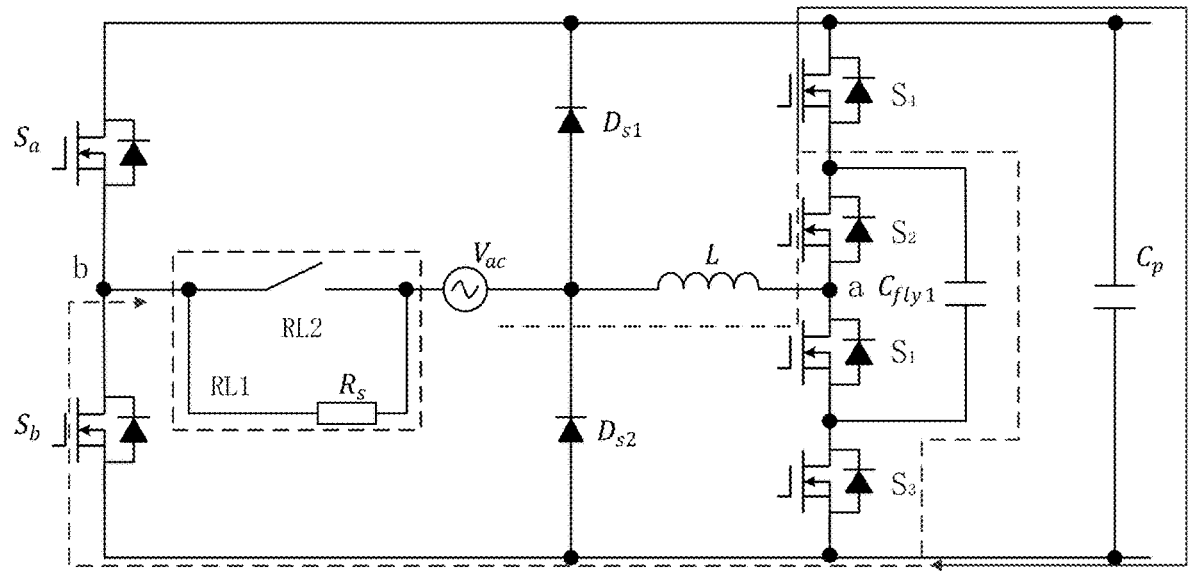
FIGS. 2A and 2B are schematic views of a charging loop within positive and negative half periods formed when a controller controls switching operation of switches after the controller is activated, and begins to operate in one embodiment of FIG. 1.

As shown in FIG. 2A, when the power supply $V_{ac}$ operates in the positive half period, the controller controls the switching device $S_3$ to turn on, and the first switch RL1 is turned on, and the power supply $V_{ac}$, the inductor L, the switching device $S_2$, the flying capacitor $C_{fly1}$, the switching device $S_3$, the switching device $S_b$ and the soft-start resistor $R_s$ form a charging loop for charging the flying capacitor $C_{fly1}$. Alternatively, the controller controls the switches $S_b$ and/or $S_2$ and $S_3$ to turn on, and the first switch RL1 is turned on, and the power supply $V_{ac}$, the inductor L, the switching device $S_2$, the flying capacitor $C_{fly1}$, the switching device $S_3$, the switching device $S_b$ and the soft-start resistor $R_s$ form a charging loop for charging the flying capacitor $C_{fly1}$. The first switch RL1 is turned on, and the power supply $V_{ac}$, the inductor L, the switches $S_2$ and $S_4$, the DC bus capacitor $C_p$, the switching device $S_b$ and the soft-start resistor $R_s$ form a charging loop for charging the DC bus capacitor $C_p$. Alternatively, the controller controls the switches $S_b$ and/or $S_2$ and/or $S_4$ to turn on, the first switch RL1 is turned on, and the power supply $V_{ac}$, the inductor L, the switches $S_2$ and $S_4$, the DC bus capacitor $C_p$, the switching device $S_b$ and the soft-start resistor $R_s$ form a charging loop for charging the DC bus capacitor $C_p$.

Figure 2B:
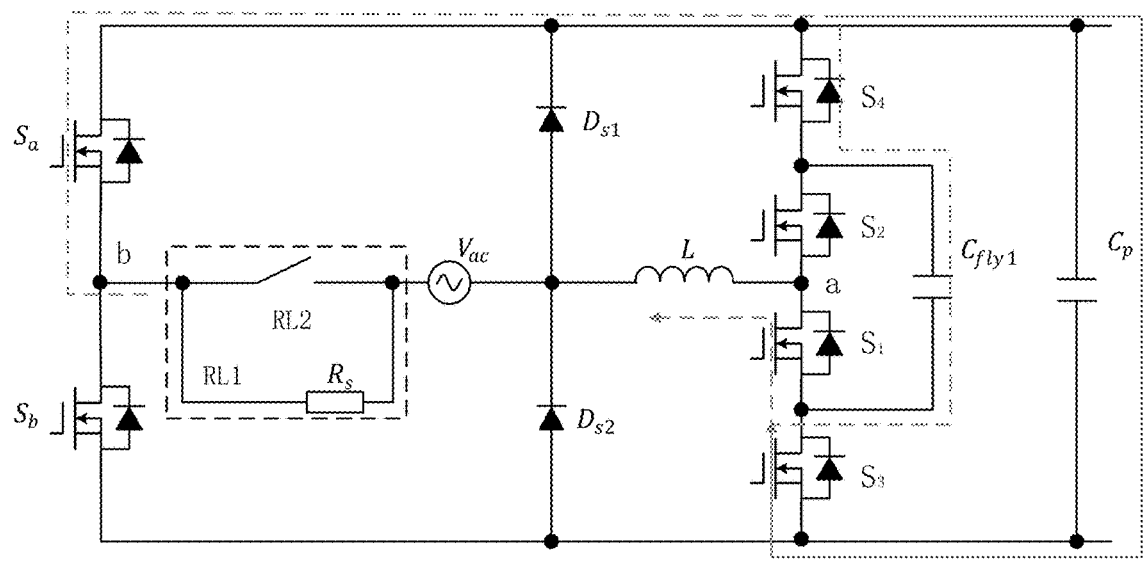

As shown in FIG. 2B, when the power supply $V_{ac}$ operates in the negative half period, the controller controls the switching device $S_4$ to turn on, the first switch RL1 is turned on, and the power supply $V_{ac}$, the inductor L, the switches $S_1$ and $S_3$, the flying capacitor $C_{fly1}$, the switching device $S_4$, the switching device $S_a$ and the soft-start resistor $R_s$ form a charging loop for charging the flying capacitor $C_{fly1}$. Alternatively, the controller controls the switches $S_a$ and/or $S_1$ and $S_4$ to turn on, the first switch RL1 is turned on, and the power supply $V_{ac}$, the inductor L, the switches $S_1$ and $S_3$, the flying capacitor $C_{fly1}$, the switching device $S_4$, the switching device $S_a$ and the soft-start resistor $R_s$ form a charging loop for charging the flying capacitor $C_{fly1}$. The first switch RL1 is turned on, and the power supply $V_{ac}$, the inductor L, the switches $S_1$ and $S_3$, the DC bus capacitor $C_p$, the switching device $S_a$ and the soft-start resistor $R_s$ form a charging loop for charging the DC bus capacitor $C_p$. Alternatively, the controller controls the switches $S_a$ and/or $S_1$ and/or $S_3$ to turn on, the first switch RL1 is turned on, and the power supply $V_{ac}$, the inductor L, the switches $S_1$ and $S_3$, the DC bus capacitor $C_p$, the switching device $S_a$ and the soft-start resistor $R_s$ form a charging loop for charging the DC bus capacitor $C_p$.

When the voltage of the DC bus capacitor $C_p$ is charged to a second preset value $V_{Bulk}$, the DC bus capacitor $C_p$ completes charging. Considering of a voltage drop of the line and the device, the second preset value $V_{Bulk}$ shall be slightly less than a voltage peak value $V_{ab\_peak}$ of a voltage $V_{ab}$ between the midpoint a and the midpoint b. When a voltage $V_{Cfly1}$ of the flying capacitor $C_{fly1}$ is charged to first preset value, $V_{Cfly1}$ equals to $V_{Cp}$, the controller controls the switches $S_3$ and $S_4$ to turn off, the power supply $V_{ac}$ continues to charge the DC bus capacitor $C_p$, and when the voltage of the DC bus capacitor $C_p$ is charged to the second preset value $V_{Bulk}$, the DC bus capacitor $C_p$ completes charging. The first preset value is a half of the second preset value. After the DC bus capacitor $C_p$ completes charging, the controller controls all switches 21 of the second bridge arm 20 to turn off, and then controls the second switch RL2 to turn on, and controls the first switch RL1 to turn off, and the controller begins to control the three-level conversion circuit to operate in normal operation.

As shown in FIGS. 2A and 2B, when the power supply $V_{ac}$ operates in the positive half period, and the power supply $V_{ac}$ charges the flying capacitor $C_{fly1}$ and the DC bus capacitor $C_p$ simultaneously, a relation of $V_{S4}+V_{Cfly1}=V_{Cp}$ exists. Initial voltage $V_{Cfly1}$ of the flying capacitor $C_{fly1}$ and initial voltage $V_{Cp}$ of the DC bus capacitor $C_p$ are zero, and the switching device $S_4$ does not have an overvoltage state, so additional protection is unnecessary. When the power supply $V_{ac}$ operates in the negative half period, the power supply $V_{ac}$ charges the flying capacitor $C_{fly1}$ and the DC bus capacitor $C_p$ simultaneously, a relation of $V_{S3}+V_{Cfly1}=V_{Cp}$ exists. Initial voltage $V_{Cfly1}$ of the flying capacitor $C_{fly1}$ and initial voltage $V_{Cp}$ of the DC bus capacitor $C_p$ are zero, and the switching device $S_3$ does not have an overvoltage state, so additional protection is unnecessary. If a charging rate of the DC bus capacitor $C_p$ is faster than that of the flying capacitor $C_{fly1}$, the switches $S_4$ and $S_3$ may bear corresponding voltages, but generally, a capacitance of the DC bus capacitor $C_p$ is about several hundreds of μF, while a capacitance of the corresponding flying capacitor $C_{fly1}$ often does not exceed 100 μF, so a charging rate of the flying capacitor $C_{fly1}$ is faster, and the switches $S_4$ and $S_3$ would not bear a larger voltage.

After charging of the DC bus capacitor $C_p$ is completed, the three-level conversion circuit normally operates, and if the voltage $V_{Cp}$ of the DC bus capacitor $C_p$ is higher than an output voltage of the uncontrolled rectifier bridge 31, the auxiliary power supply 40 is powered by the DC bus through the anti-reverse diodes $D_1$ and $D_2$. When the three-level conversion circuit occurs a fault, the first switch RL1 and the second switch RL2 are turned off. After the fault is resolved, the first switch RL1 is turned on again to charge the flying capacitor $C_{fly1}$ and the DC bus capacitor $C_p$, or the second switch RL2 is turned on, and the first switch RL1 is turned off, such that the three-level conversion circuit normally operates.

Figure 3:
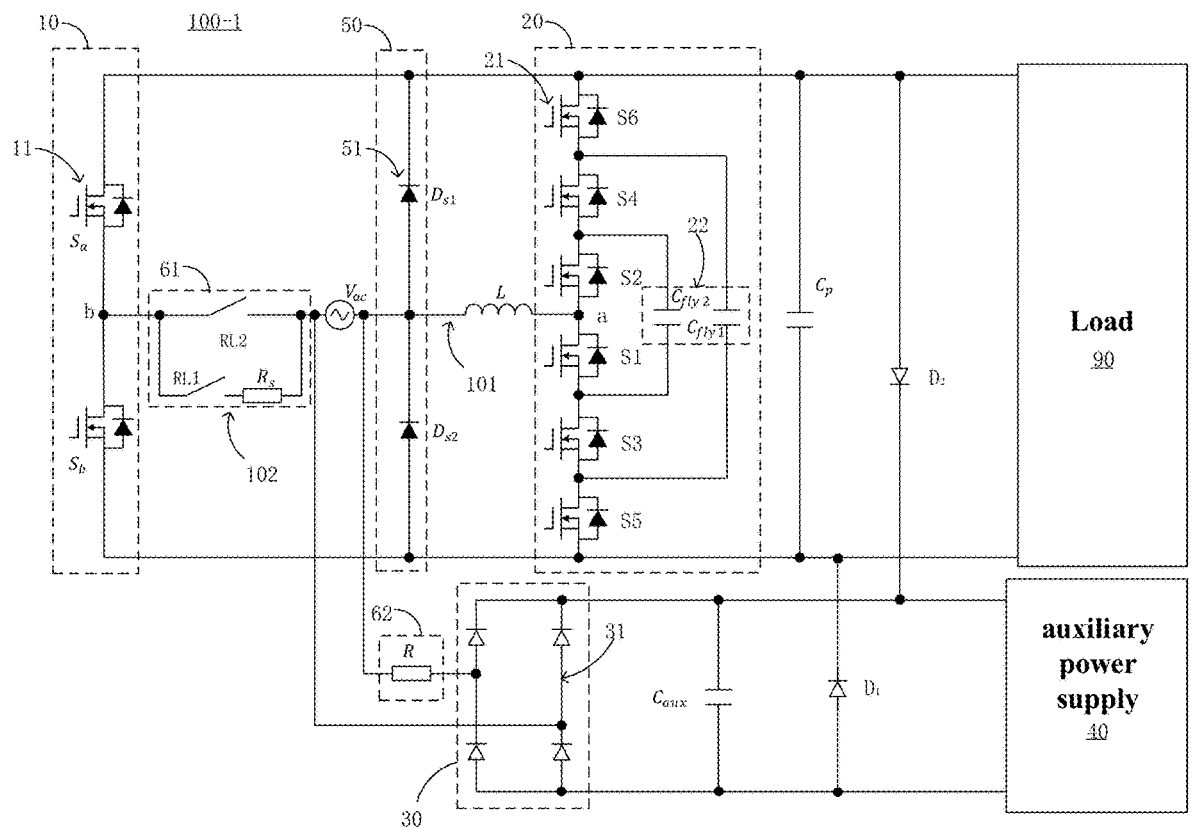
FIG. 3 is a four-level conversion circuit having a flying capacitor according to a second embodiment of the invention.
Figure 5:
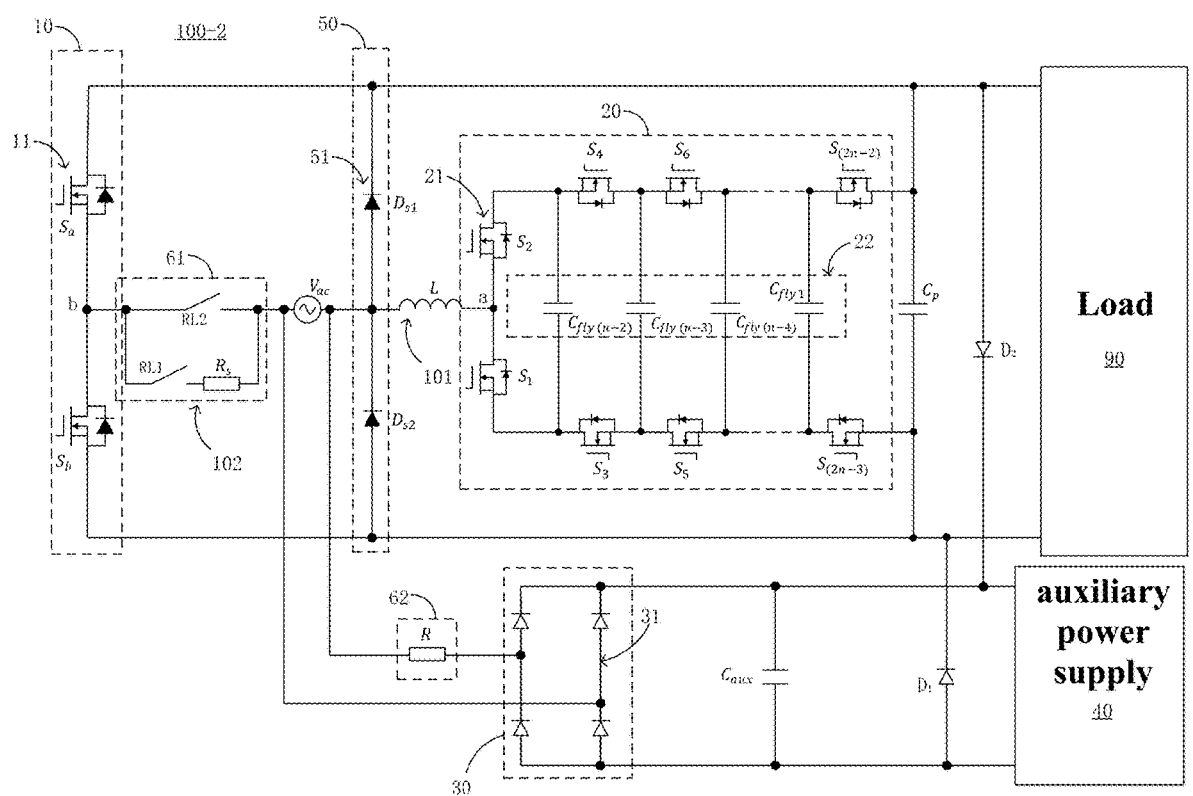
FIG. 5 is a n-level conversion circuit having a flying capacitor according to a third embodiment of the invention.

In some embodiments, the multilevel conversion circuit may be further a n-level conversion circuit, where n is a positive integer greater than 3, for example, a four-level conversion circuit (as shown in FIG. 3) or a multilevel conversion circuit (as shown in FIG. 5).

In the n-level conversion circuit of the disclosure, the first bridge arm 10 may include a plurality of switches connected in series, for example, switches $S_a$ and $S_b$, the second bridge arm 20 may include (2n−2) switches 21 connected in series, and the flying capacitor 22 may include (n−2) flying capacitors. In detail, the i-th flying capacitor is connected between the i-th switching device and the (2n−1−i)th switching device of the second bridge arm 20, where i=1, 2, . . . , n−2. For example, a four-level PFC circuit 100-1 shown in FIG. 3 includes two flying capacitors, i.e., flying capacitors $C_{fly1}$ and $C_{fly2}$, and the first flying capacitor $C_{fly1}$ is connected between the first switching device $S_6$ and the sixth switching device $S_5$, and the second flying capacitor $C_{fly2}$ is connected between the second switching device $S_4$ and the fifth switching device $S_3$. A n-level PFC circuit 100-2 shown in FIG. 5 includes (n−2) flying capacitors, i.e., flying capacitors $C_{fly1}$, $C_{fly2}$, $C_{fly3}$, . . . , and $C_{fly(n-2)}$, and the first flying capacitor $C_{fly1}$ is connected between the first switching device $S_{(2n-2)}$ and the (2n−2)th switching device $S_{(2n-3)}$, . . . , and the (n−2)th flying capacitor $C_{fly(n-2)}$ is connected between the (n−2)th switching device $S_4$ and the (n+1)th switching device $S_3$.

Before the controller is activated, the first current limiting circuit 61 is disabled. When the controller is activated, and controls the corresponding switches 21 of the second bridge arm 20 to turn on, the power supply $V_{ac}$ charges the flying capacitors $C_{fly1}$, $C_{fly2}$, $C_{fly3}$, . . . , and $C_{fly(n-2)}$ through the corresponding switches 11 of the first bridge arm 10, the first current limiting circuit 61, and the corresponding switches 21 of the second bridge arm 20, and the power supply $V_{ac}$ charges the DC bus capacitor $C_p$ through the corresponding switches 11 of the first bridge arm 10, the first current limiting circuit 61, the corresponding switches 21 of the second bridge arm 20. During the process when the power supply charges the flying capacitors $C_{fly1}$, $C_{fly2}$, $C_{fly3}$, . . . , and $C_{fly(n-2)}$ and the DC bus capacitor $C_p$, the first current limiting circuit 61 is conducted.

In some embodiments, the n-level conversion circuit may further include a third bridge arm 50. The third bridge arm 50 includes a plurality of switches 51 connected in series. A midpoint of the third bridge arm 50 may be connected between the power supply $V_{ac}$ and the inductor L. When the controller is activated, and controls the corresponding switches 21 of the second bridge arm 20 to turn on, the power supply $V_{ac}$ may charge the flying capacitors $C_{fly1}$, $C_{fly2}$, $C_{fly3}$, . . . , and $C_{fly(n-2)}$ through the corresponding switches 21 of the second bridge arm 20, the corresponding switches 11 of the first bridge arm 10 and the first current limiting circuit 61. Alternatively, the power supply $V_{ac}$ may charge the flying capacitors $C_{fly1}$, $C_{fly2}$, $C_{fly3}$, . . . , and $C_{fly(n-2)}$ through the corresponding switches 21 of the second bridge arm 20, the corresponding switches 11 of the first bridge arm 10, the first current limiting circuit 61 and the corresponding switches 51 of the third bridge arm 50. During the process when the power supply charges the flying capacitors $C_{fly1}$, $C_{fly2}$, $C_{fly3}$, . . . , and $C_{fly(n-2)}$, the first current limiting circuit 61 is conducted.

In some embodiments, after the first current limiting circuit 61 is conducted, the power supply $V_{ac}$ may further charge the DC bus capacitor $C_p$ through the corresponding switches 11 of the first bridge arm 10, the first current limiting circuit 61 and the corresponding switches 21 of the second bridge arm 20. Additionally or alternatively, the power supply $V_{ac}$ may further charge the DC bus capacitor $C_p$ through the corresponding switches 11 of the first bridge arm 10, the first current limiting circuit 61 and the corresponding switches 51 of the third bridge arm 50.

In some embodiments, when a voltage $V_{Cfly1}$ of the i-th flying capacitor $C_{flyi}$ reaches (n−1−i)/(n−1) times of the second preset value $V_{Bulk}$, the controller may be configured to control the corresponding switches 21 of the second bridge arm 20 to turn off.

Hereinafter the principle of the disclosure is further described and explained in details with reference to a n-level PFC circuit (where n is a natural number greater than 3) shown in FIGS. 3 to 9.

As shown in FIG. 3, it illustrates a flying-capacitor clamped four-level PFC circuit 100-1 according to the disclosure. After the power supply $V_{ac}$ is powered on, since the first switch RL1 and the second switch RL2 are turned off, voltage of the flying capacitor 22 and voltage of the DC bus capacitor $C_p$ are zero, and the power supply $V_{ac}$ establishes the voltage on the capacitor $C_{aux}$ through the second current limiting circuit 62 and the uncontrolled rectifier bridge 31 for powering the auxiliary power supply 40. The auxiliary power supply 40 is activated and powers the controller, and the controller begins to operate. The controller controls switching operation of the corresponding switches 21 of the second bridge arm 20, the power supply $V_{ac}$ is connected to the charging loops consisting of the flying capacitor and the DC bus capacitor through the soft-start resistor $R_s$, and the charging loops within positive and negative half periods are shown in FIGS. 4A and 4B.

Figure 4A:
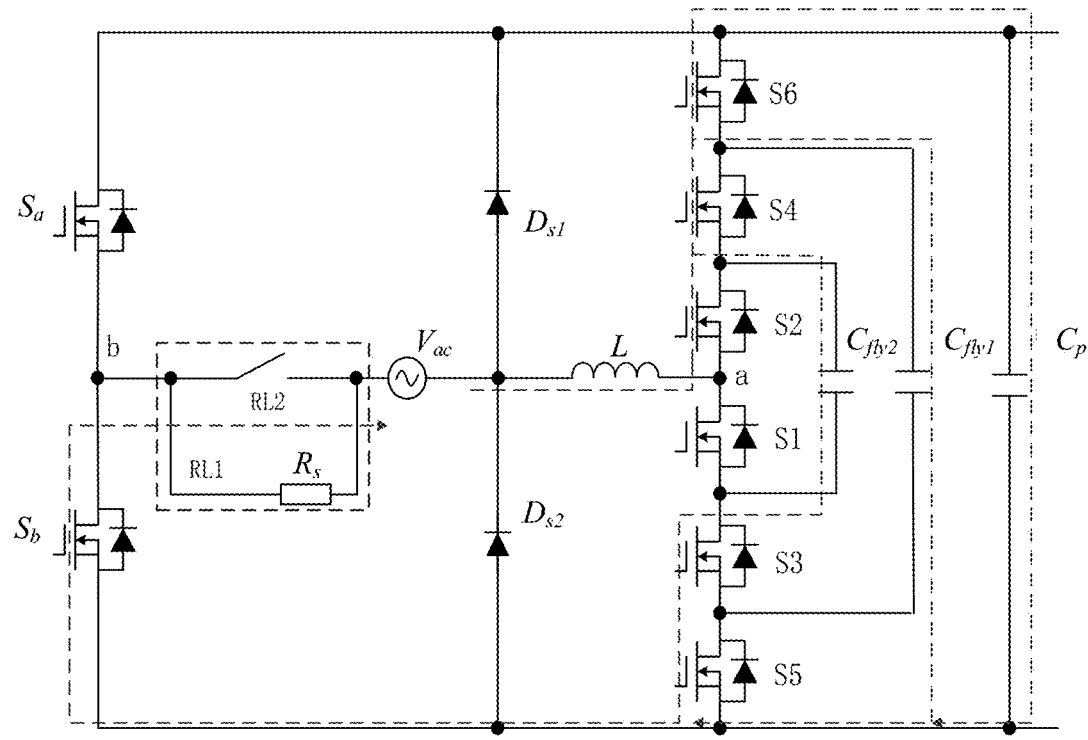
FIGS. 4A and 4B are schematic views of a charging loop within positive and negative half periods formed when a controller controls switching operation of switches after the controller is activated, and begins to operate in one embodiment of FIG. 3.

As shown in FIG. 4A, when the power supply $V_{ac}$ operates in the positive half period, the controller controls the switches $S_3$ and $S_5$ to turn on, and the power supply $V_{ac}$, the inductor L, the switching device $S_2$, the flying capacitor $C_{fly2}$, the switches $S_3$ and $S_5$, the switching device $S_b$ and the soft-start resistor $R_s$ to form a charging loop for charging the flying capacitor $C_{fly2}$. The controller controls the switching device $S_5$ to turn on, and the power supply $V_{ac}$, the inductor L, the switches $S_4$ and $S_2$, the flying capacitor $C_{fly1}$, the switching device $S_5$, the switching device $S_b$ and the soft-start resistor $R_s$ to form a charging loop for charging the flying capacitor $C_{fly1}$. The power supply $V_{ac}$, the inductor L, the switches $S_2$, $S_4$ and $S_6$, the DC bus capacitor $C_p$, the switching device $S_b$ and the soft-start resistor $R_s$ to form a charging loop for charging the DC bus capacitor $C_p$.

Figure 4B:
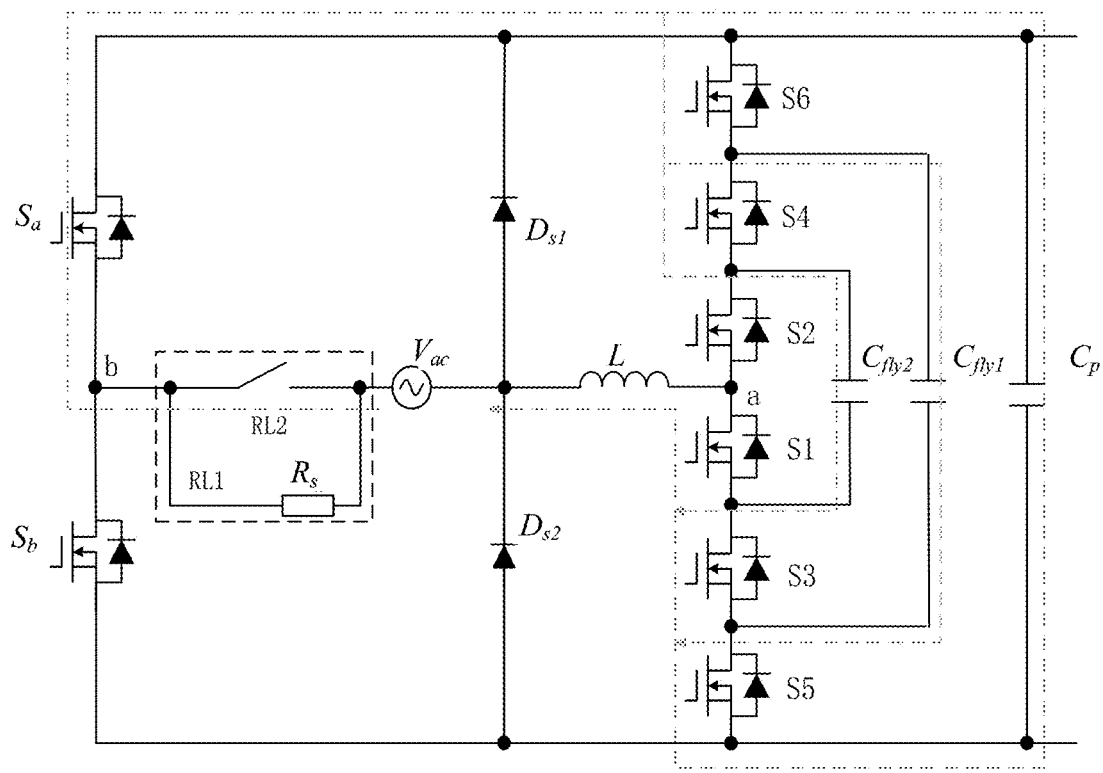

As shown in FIG. 4B, when the power supply $V_{ac}$ operates in the negative half period, the controller controls the switches $S_4$ and $S_6$ to turn on, and the power supply $V_{ac}$, the inductor L, the switching device $S_1$, the flying capacitor $C_{fly2}$, the switches $S_4$ and $S_6$, the switching device $S_a$ and the soft-start resistor $R_s$ to form a charging loop for charging the flying capacitor $C_{fly2}$. The controller controls the switching device $S_6$ to turn on, and the power supply $V_{ac}$, the inductor L, the switches $S_3$ and $S_1$, the flying capacitor $C_{fly1}$, the switching device $S_6$, the switching device $S_a$ and the soft-start resistor $R_s$ to form a charging loop for charging the flying capacitor $C_{fly1}$. The power supply $V_{ac}$, the inductor L, the switches $S_1$, $S_3$ and $S_5$, the DC bus capacitor $C_p$, the switching device $S_a$ and the soft-start resistor $R_s$ to form a charging loop for charging the DC bus capacitor $C_p$.

When the voltage of the DC bus capacitor $C_p$ is charged to the second preset value $V_{Bulk}$, considering of a voltage drop of the line and the device, the second preset value $V_{Bulk}$ shall be slightly less than a voltage peak value $V_{ab\_peak}$ of the voltage $V_{ab}$ between the midpoint a and the midpoint b. When a voltage $V_{Cfly2}$ of the flying capacitor $C_{fly2}$ reaches one third of the second preset value i.e. $V_{Bulk}/3$, a relation of $V_{Cfly2} = V_{Cfly1} = V_{Cp}$ exists, the flying capacitor $C_{fly2}$ completes charging, and the controller turns off the switches $S_3$ and $S_4$. When a voltage $V_{Cfly1}$ of the flying capacitor $C_{fly1}$ reaches two third of the second preset value, i.e. $2V_{Bulk}/3$, a relation of $V_{Cfly1} = V_{Cp}$ exists, the flying capacitor $C_{fly1}$ completes charging, and the controller turns off the switches $S_5$ and $S_6$. When the voltage $V_{Cp}$ of the DC bus capacitor $C_p$ reaches the second preset value $V_{Bulk}$, the DC bus capacitor $C_p$ completes charging, the controller firstly controls all switches of the second bridge arm to turn off, then turns on the second switch RL2, and finally turns off the first switch RL1, and the controller begins to control the four-level conversion circuit to normally operate.

As shown in FIGS. 4A and 4B, when the power supply $V_{ac}$ operates in the positive half period, in the charging loop for the flying capacitor $C_{fly1}$, a relation of $V_{S6} + V_{Cfly1} = V_{Cp}$ exists, and since initial voltage of the flying capacitor $C_{fly1}$ and initial voltage of the DC bus capacitor $C_p$ are zero, i.e. $V_{Cfly1} = V_{Cp} = 0$, the switching device $S_6$ does not have an overvoltage state, so additional protection is unnecessary. Similarly, when the power supply $V_{ac}$ operates in the negative half period, in the charging loop for the flying capacitor $C_{fly1}$, a relation of $V_{S5}+V_{Cfly1}=V_{Cp}$ exists, but since initial voltage of the flying capacitor $C_{fly1}$ and initial voltage of the DC bus capacitor $C_p$ are zero, i.e. $V_{Cfly1}=V_{Cp}=0$, the switching device $S_5$ does not have an overvoltage state, so additional protection is unnecessary. When the power supply $V_{ac}$ operates in the positive half period, in the charging loop of the flying capacitor $C_{fly2}$, a relation of $V_{S4}+V_{Cfly2}=V_{Cfly1}$ exists, and since initial voltage of the flying capacitor $C_{fly2}$ and initial voltage of the flying capacitor $C_{fly1}$ are zero, i.e. $V_{Cfly1}=V_{Cfly2}=0$, the switching device $S_4$ does not have an overvoltage state, so additional protection is unnecessary. Similarly, when the power supply $V_{ac}$ operates in the negative half period, in the charging loop of the flying capacitor $C_{fly2}$, a relation of $V_{S3}+V_{Cfly2}=V_{Cfly1}$ exists, and since initial voltage of the flying capacitor $C_{fly1}$ and initial voltage of the flying capacitor $C_{fly2}$ are zero, i.e. $V_{Cfly1}=V_{Cfly2}=0$, the switching device $S_3$ does not have an overvoltage state, so additional protection is unnecessary.

After the DC bus capacitor $C_p$ completes charging, the four-level conversion circuit normally operates, and if the voltage $V_{Cp}$ of the DC bus capacitor $C_p$ is higher than an output voltage of the uncontrolled rectifier bridge 31, the auxiliary power supply 40 is powered by the DC bus capacitor $C_p$ through the anti-reverse diodes $D_1$ and $D_2$. When the four-level conversion circuit occurs a fault, the first switch RL1 and the second switch RL2 are turned off. After the fault is resolved, the first switch RL1 is turned on again to charge the flying capacitors $C_{fly1}$, $C_{fly2}$ and the DC bus capacitor $C_p$, or the second switch RL2 is turned on, and the first switch RL1 is turned off, such that the four-level conversion circuit normally operates.

As shown in FIG. 5, it illustrates a flying-capacitor clamped n-level PFC circuit 100-2 according to the disclosure. After the power supply $V_{ac}$ is powered on, since the first switch RL1 and the second switch RL2 are turned off, voltage of the flying capacitor 22 and voltage of the DC bus capacitor $C_p$ are zero, and the power supply $V_{ac}$ establishes the voltage on the capacitor $C_{aux}$ through the second current limiting circuit 62 and the uncontrolled rectifier bridge 31 for powering the auxiliary power supply 40. As the auxiliary power supply 40 is activated to power the controller, the controller begins to operate. The controller controls switching operation of the switches to form a charging loop, such that the power supply $V_{ac}$ charges the flying capacitor 22 and the DC bus capacitor $C_p$ through the soft-start resistor $R_s$, and the charging loops within positive and negative half periods are shown in FIGS. 6A and 6B.

Figure 6A:
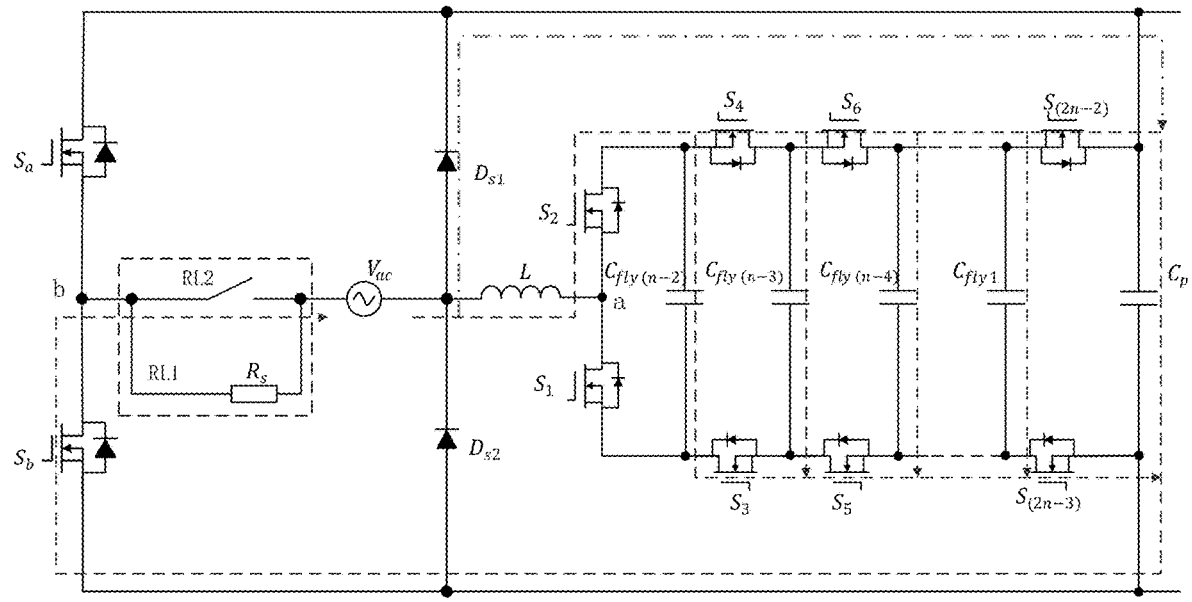
FIGS. 6A and 6B are schematic views of a charging loop within positive and negative half periods formed when a controller controls switching operation of switches after the controller is activated, and begins to operate in one embodiment of FIG. 5.

As shown by a dashed line in FIG. 6A, when the power supply $V_{ac}$ operates in the positive half period, the controller controls the switches $S_3$ to $S_{(2n-3)}$ to turn on, and the power supply $V_{ac}$ charges the flying capacitors $C_{fly1}$, $C_{fly2}$, $C_{fly3}$, ..., and $C_{fly(n-2)}$ through the inductor L, the switches $S_b$ and $S_2$ to $S_{(2n-2)}$, the switches $S_3$ to $S_{(2n-3)}$, and the soft-start resistor $R_s$. When a voltage of the i-th flying capacitor $C_{fly1}$ reaches $(n-1-i)/(n-1)$ times of the second preset value $V_{Bulk}$, the controller controls the switches $S_{(2n-1-2i)}$ and $S_{(2n-2i)}$ at an outer side of the corresponding flying capacitor $C_{flyi}$. Here, i=1, 2, 3, ..., and n−2.

In some embodiments, the power supply $V_{ac}$ charges the DC bus capacitor $C_p$ through the inductor L, the switches $S_b$ and $S_2$ to $S_{(2n-2)}$, and the soft-start resistor $R_s$.

Figure 6B:
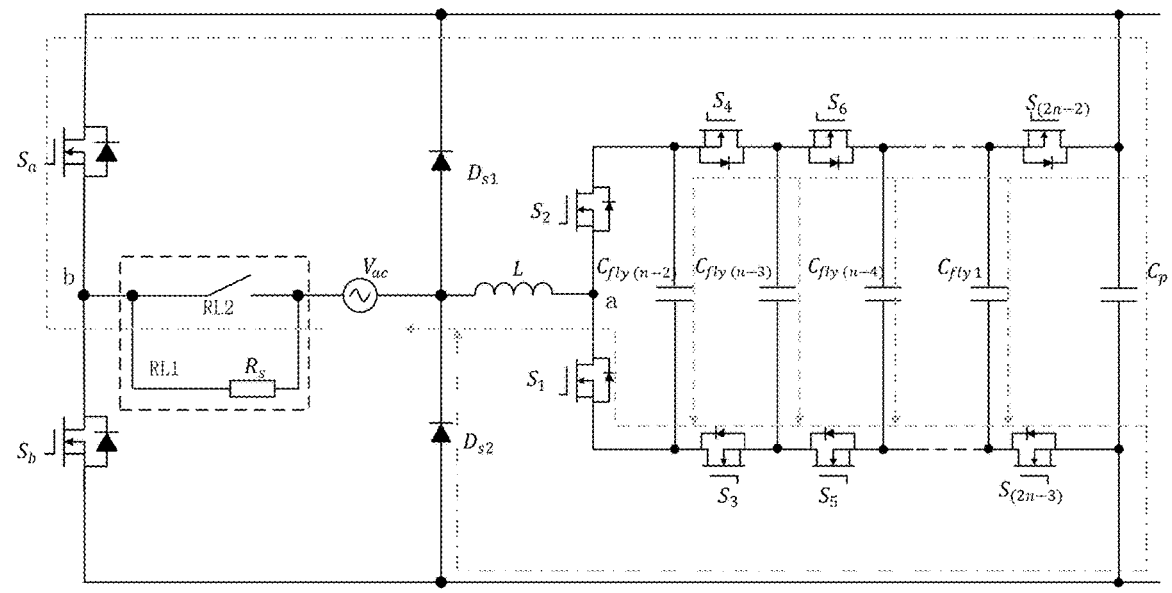

As shown by a dashed line in FIG. 6B, when the power supply $V_{ac}$ operates in the negative half period, the controllable switches in the switches $S_2$ to $S_{(2n-2)}$ must be turned on, and the controllable switches in the switches $S_a$ and $S_1$ to $S_{(2n-3)}$ may be optionally turned on or turned off, and the power supply $V_{ac}$ charges the flying capacitors $C_{fly1}$, $C_{fly2}$, $C_{fly3}$, ..., and $C_{fly(n-2)}$ through the inductor L, the switches $S_a$ and $S_1$ to $S_{(2n-3)}$, the switches $S_2$ to $S_{(2n-2)}$, and the soft-start resistor $R_s$. When a voltage of the i-th flying capacitor $C_{fly1}$ reaches $(n-1-i)/(n-1)$ times of the second preset value $V_{Bulk}$ (i=1, 2, 3, ..., and n−2), the controller controls the switches $S_{(2n-1-2i)}$ and $S_{(2n-2i)}$ at an outer side of the corresponding flying capacitor $C_{flyi}$ to turn off.

In some embodiments, the power supply $V_{ac}$ charges the DC bus capacitor $C_p$ through the inductor L, the switches $S_a$ and $S_1$ to $S_{(2n-3)}$, and the soft-start resistor $R_s$.

After the DC bus capacitor $C_p$ completes charging, the controller controls all switches of the second bridge arm to turn off, the second switch RL2 to turn on, and the first switch RL1 to turn off, and the controller begins to control the n-level conversion circuit to operate in normal operation.

In some embodiments, the n-level conversion circuit has a third bridge arm 50, the third bridge arm 50 includes a plurality of switches 51 connected in series, for example, diodes $D_{s1}$ and $D_{s2}$. The power supply $V_{ac}$ charges the flying capacitor 22 and the DC bus capacitor $C_p$ through the soft-start resistor $R_s$ by use of the third bridge arm 50 of the n-level conversion circuit, and the charging loops in the positive and negative half periods are shown in FIGS. 7A and 7B.

Figure 7A:
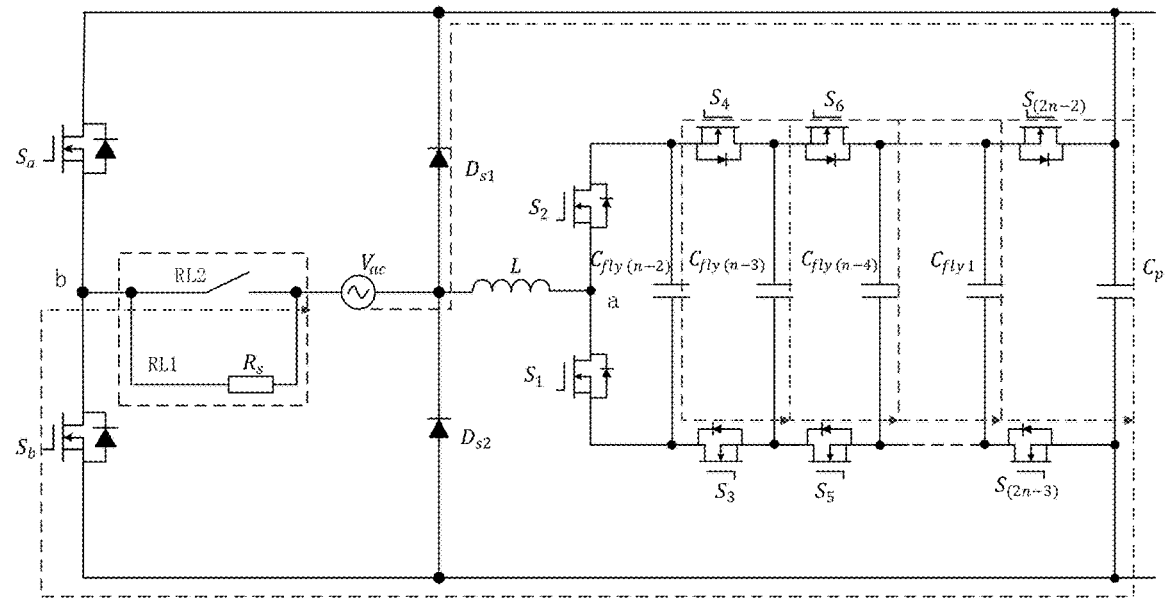
FIGS. 7A and 7B are schematic views of another charging loop within positive and negative half periods formed when a controller controls switching operation of switches after the controller is activated, and begins to operate in one embodiment of FIG. 5.

As shown by a dashed line in FIG. 7A, when the power supply $V_{ac}$ operate in the positive half period, the controller controls the switches $S_3$ to $S_{(2n-3)}$ and $S_2$ to $S_{(2n-2)}$ to turn on, and the power supply $V_{ac}$ charges the flying capacitors $C_{fly1}$, $C_{fly2}$, $C_{fly3}$, ..., and $C_{fly(n-2)}$ through the diode $D_{s1}$, the switches $S_3$ to $S_{(2n-3)}$ and $S_2$ to $S_{(2n-2)}$, the switches $S_b$, and the soft-start resistor $R_s$. When a voltage of the i-th flying capacitor $C_{fly1}$ reaches $(n-1-i)/(n-1)$ times of the second preset value $V_{Bulk}$, the controller controls the switches $S_{(2n-1-2i)}$ and $S_{(2n-2i)}$ at an outer side of the corresponding flying capacitor $C_{fly1}$ to turn off. Here, i=1, 2, 3, ... and n−2.

In some embodiments, the power supply $V_{ac}$ charges the DC bus capacitor $C_p$ through the inductor L, the switches $S_b$ and $S_2$ to $S_{(2n-2)}$, and the soft-start resistor $R_s$. Additionally or alternatively, the power supply $V_{ac}$ charges the DC bus capacitor $C_p$ through the diode $D_{s1}$, the switching device $S_b$, and the soft-start resistor $R_s$. When the voltage $V_{Cp}$ of the DC bus capacitor $C_p$ reaches the second preset value $V_{Bulk}$, the DC bus capacitor $C_p$ completes charging.

Figure 7B:
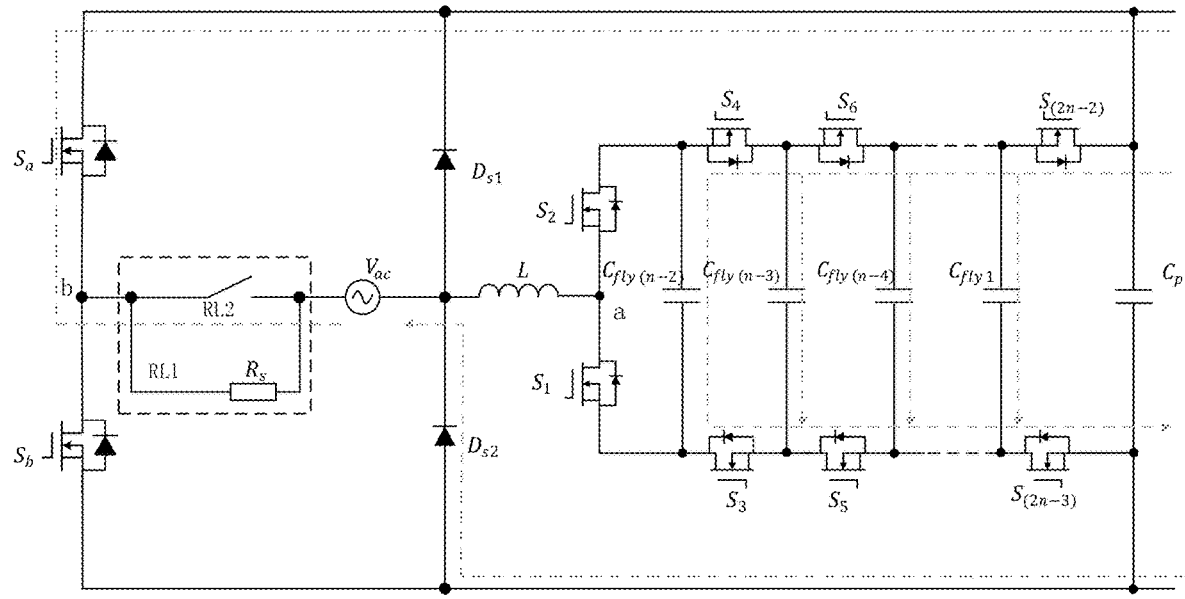

As shown by a dashed line in FIG. 7B, when the power supply $V_{ac}$ operates in the negative half period, the controller controls the switches $S_3$ to $S_{(2n-3)}$ and the switches $S_2$ to $S_{(2n-2)}$ to turn on, and the power supply $V_{ac}$ charges the flying capacitors $C_{fly1}$, $C_{fly2}$, $C_{fly3}$, ..., and $C_{fly(n-2)}$ through the diode $D_{s2}$, the switches $S_3$ to $S_{(2n-3)}$ and the switches $S_2$ to $S_{(2n-2)}$, the switches $S_a$, and the soft-start resistor $R_s$. When a voltage of the i-th flying capacitor $C_{fly1}$ reaches $(n-1-i)/(n-1)$ times of the second preset value $V_{Bulk}$ (i=1, 2, 3, ..., and n−2), the corresponding switches $S_{(2n-1-2i)}$ and $S_{(2n-2i)}$ are turned off.

In some embodiments, the power supply $V_{ac}$ charges the DC bus capacitor $C_p$ through the inductor L, the switches $S_a$ and $S_1$ to $S_{(2n-3)}$, and the soft-start resistor $R_s$. Additionally or alternatively, the power supply $V_{ac}$ charges the DC bus capacitor $C_p$ through the diode $D_{s2}$, the switching device $S_a$, and the soft-start resistor $R_s$. When the voltage $V_{Cp}$ of the DC bus capacitor $C_p$ reaches the second preset value $V_{Bulk}$, the DC bus capacitor $C_p$ completes charging.

When the DC bus capacitor $C_p$ completes charging, the controller controls all switches the second bridge arm to turn off, the second switch RL2 to turn on, and the first switch RL1 to turn off, and the controller begins to control the n-level conversion circuit to operate in normal operation.

After the DC bus capacitor $C_p$ completes charging, when the n-level conversion circuit normally operates, if the voltage $V_{Cp}$ of the DC bus capacitor $C_p$ is higher than an output voltage of the uncontrolled rectifier bridge 31, the auxiliary power supply is powered by the DC bus capacitor $C_p$ through the anti-reverse diodes $D_1$ and $D_2$. When the n-level conversion circuit occurs a fault, the first switch RL1 and the second switch RL2 are turned off. After the fault is resolved, the first switch RL1 is turned on again to charge the flying capacitor 22 and the DC bus capacitor $C_p$, or the second switch RL2 is turned on, and the first switch RL1 is turned off, and the controller controls the n-level conversion circuit to normally operate.

In some embodiments, the multilevel conversion circuit may use a single auxiliary power supply. As shown in FIG. 5, the single auxiliary power supply 40 is used, and the auxiliary power supply 40 is connected to the DC bus through the anti-reverse diodes $D_1$ and $D_2$. If an output voltage of the DC bus capacitor $C_p$ is higher than an output voltage of the uncontrolled rectifier bridge 31, the auxiliary power supply 40 is powered by the DC bus capacitor $C_p$ through the anti-reverse diodes $D_1$ and $D_2$, and the auxiliary power supply 40 is completely connected to the multilevel conversion circuit.

Figure 8:
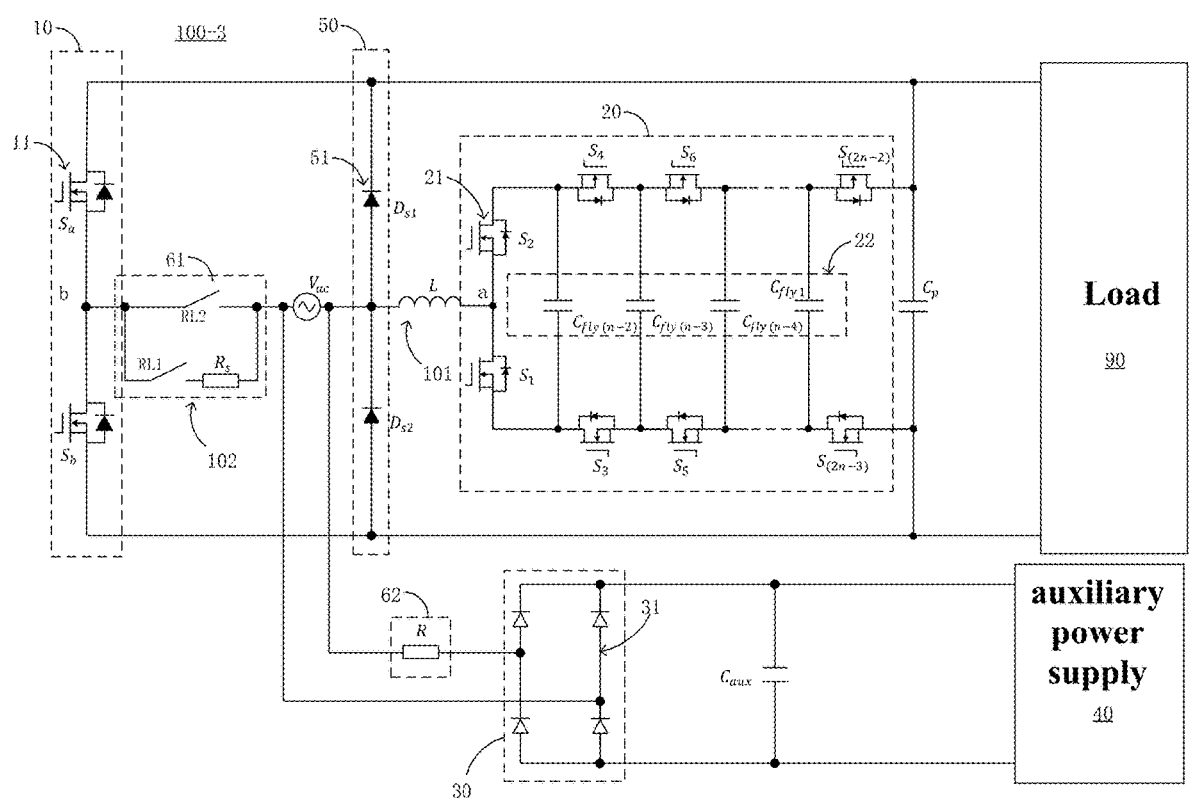
FIG. 8 is a n-level conversion circuit having a flying capacitor according to a fourth embodiment of the invention, wherein a single auxiliary power supply is used for operation.

As shown in FIG. 8, the multilevel conversion circuit, for example, a n-level PFC circuit 100-3, using the single auxiliary power supply 40, but the auxiliary power supply 40 is not connected to the DC bus capacitor $C_p$, the auxiliary power supply 40 always operates independently.

Figure 9:
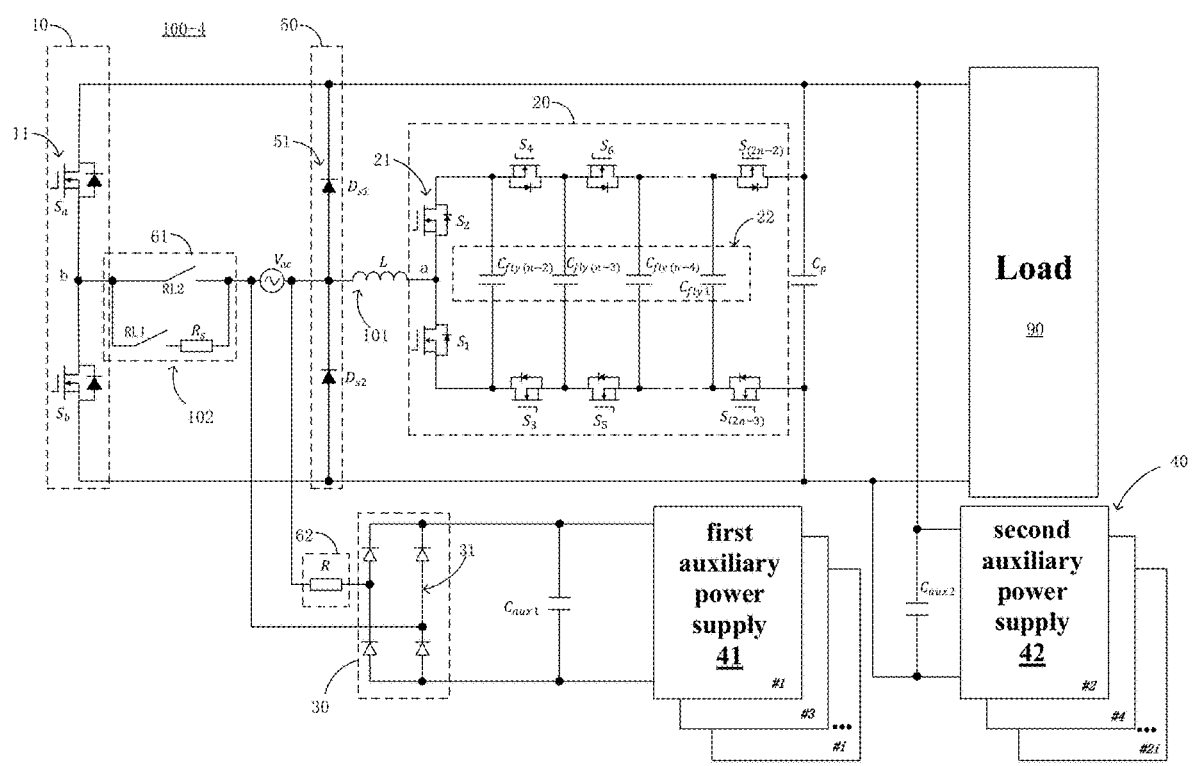
FIG. 9 is a n-level conversion circuit having a flying capacitor according to a fifth embodiment of the invention, in which a plurality of auxiliary power supplies are used for operation.

In some embodiments, the multilevel conversion circuit may further use a plurality of first auxiliary power supplies and a plurality of second auxiliary power supplies. As shown in FIG. 9, the auxiliary power supply 40 may include at least one first auxiliary power supply 41 and at least one second auxiliary power supply 42. The at least one first auxiliary power supply 41 is connected in parallel to an output end of the rectifier circuit 30, and coupled to the controller as an auxiliary power supply independent of the multilevel conversion circuit, and the at least one first auxiliary power supply 41 has a small output power mainly for supplying electric energy to the controller when the flying capacitor and the DC bus capacitor are in charging process and when the multilevel conversion circuit occurs a fault. An input end of the at least one second auxiliary power supply 42 is connected in parallel to the DC bus capacitor $C_p$ for supplying electric energy to the multilevel conversion circuit when the multilevel conversion circuit normally operates. An output power of the second auxiliary power supply 42 may be higher than the output power of the first auxiliary power supply 41.

Figure 10A:
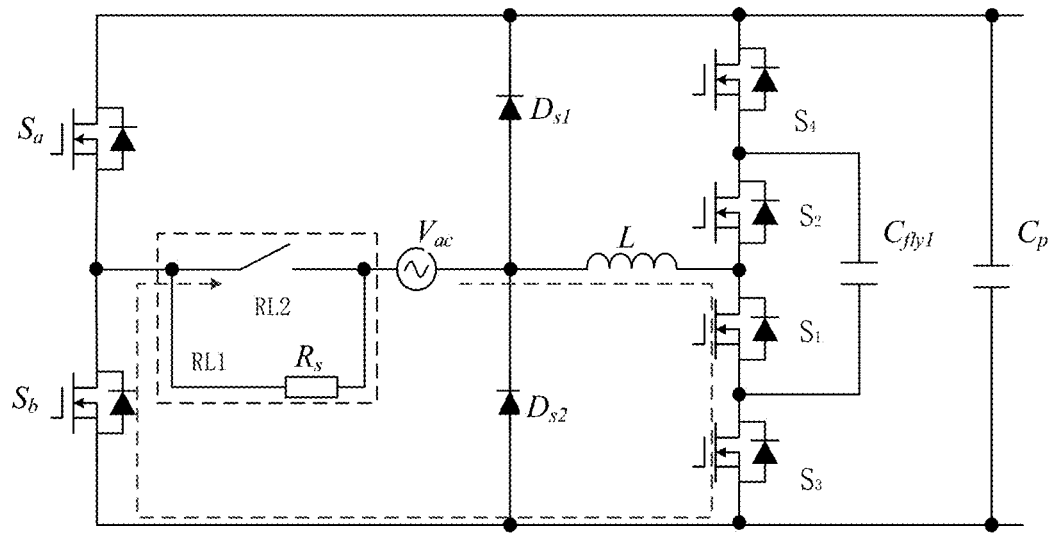
FIGS. 10A and 10B are schematic views of an inductor energy storage loop and a charging loop of a flying capacitor within a positive half period formed when the controller controls switching operation of switches after the controller is activated, and begins to operate in one embodiment of FIG. 1.
Figure 10B:
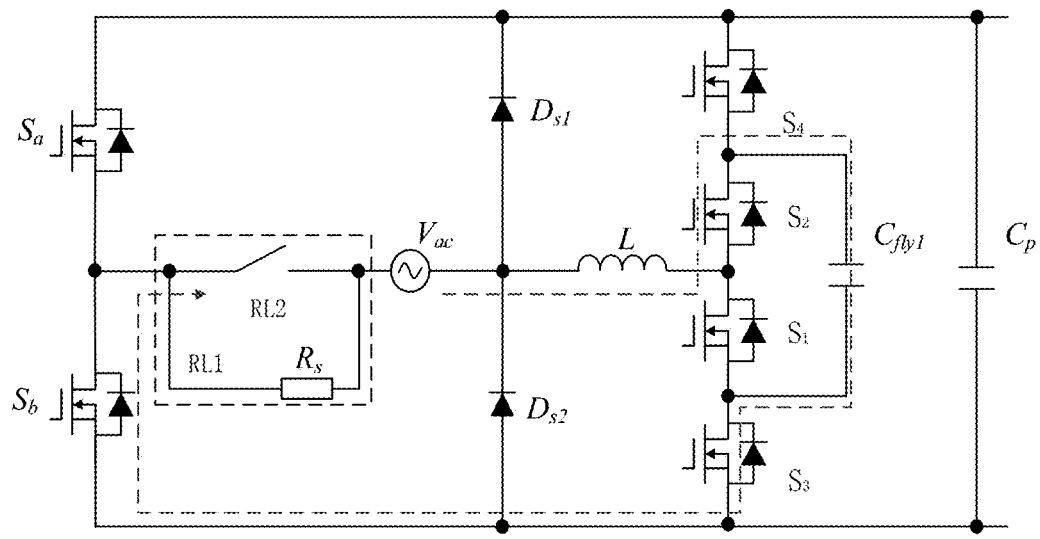

As shown in FIGS. 1, 10A and 10B, when the controller is activated, and the power supply $V_{ac}$ operates in the positive half period, the controller may turn on the switches $S_1$ and $S_3$ of the second bridge arm 20 and turn on the first switch RL1 at a first preset time, and the power supply $V_{ac}$ may charge the inductor L through the controllable switches in the switches $S_1$ and $S_3$, the switching device $S_b$, and the soft-start resistor $R_s$. The controller may turn off the switching device $S_1$ of the second bridge arm 20 and continuously turn on the switching device $S_3$ at a second preset time, and the power supply $V_{ac}$ may further charge the flying capacitor 22 through the inductor L, the switching device $S_2$, the switching device $S_3$, the switching device $S_b$, and the soft-start resistor $R_s$. FIGS. 10A and 10B form a boost circuit for quickly charging the flying capacitor $C_{fy1}$.

Figure 11A:
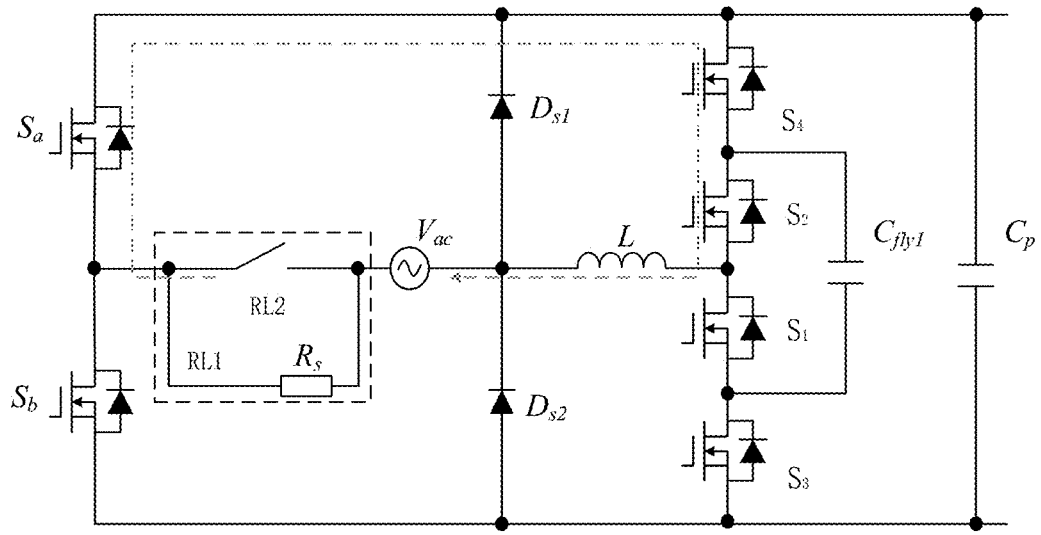
FIGS. 11A and 11B are schematic views of an inductor energy storage loop and a charging loop of a flying capacitor within a negative half period formed when the controller controls switching operation of switches after the controller is activated, and begins to operate in one embodiment of FIG. 1.
Figure 11B:
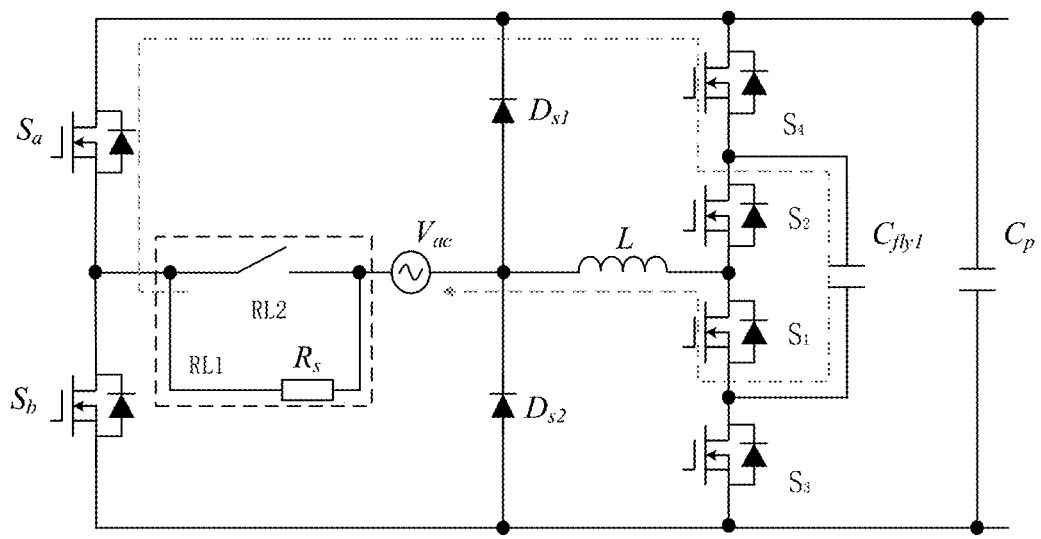

As shown in FIGS. 1, 11A and 11B, when the controller is activated, and the power supply $V_{ac}$ operates in the negative half period, the controller may turn on the switches $S_4$ and $S_2$ of the second bridge arm 20, and turn on the first switch RL1 at a first preset time, and the power supply $V_{ac}$ may charge the inductor L through the switches $S_4$ and $S_2$, the switching device $S_a$, and the soft-start resistor $R_s$. The controller may turn off the switching device $S_2$ of the second bridge arm 20, and continuously turn on the switching device $S_4$ at a second preset time, and the power supply $V_{ac}$ may further charge the flying capacitor 22 through the inductor L, the switching device $S_1$, the switching device $S_4$, the switching device $S_a$, and the soft-start resistor $R_s$. FIGS. 11A and 11B form a boost circuit for quickly charging the flying capacitor $C_{fy1}$.

As shown in FIGS. 10A-11B, they illustrate boost circuits formed by a three-level converter for quickly charging the flying capacitor $C_{fy1}$. Further, as for the n-level conversion circuit (as shown in FIG. 5), it also can form boost circuits for quickly charging flying capacitors $C_{fy1}$, $C_{fy2}$, $C_{fy3}$, . . . , and $C_{fy(n-2)}$.

In the above embodiments, after the power supply is powered on, the at least one first auxiliary power supply may be supplied with electric energy through the rectifier circuit to establish an operating voltage, and the established operating voltage is used to supply electric energy to the controller. After the controller begins to operate, the controller controls the corresponding switches of the second bridge arm to turn on, thereby establishing charging loops for the flying capacitor and the DC bus capacitor. Since initial voltage of the flying capacitor and initial voltage of the DC bus capacitor are zero before the controller is activated, when the power supply charges the DC bus capacitor and the flying capacitor, the two switches connected in series at the outer side of the flying capacitor would not be damaged due to overvoltage. Meanwhile, the at least one first auxiliary power supply is connected in parallel to the DC bus capacitor through the anti-reverse diodes, and when the voltage of the DC bus capacitor is higher than the output voltage of the rectifier circuit, the DC bus capacitor powers the at least one first auxiliary power supply through the anti-reverse diodes. The auxiliary power supply also can include at least one second auxiliary power supply coupled in parallel to both ends of the DC bus capacitor, and at least one second auxiliary power supply has a larger output power for supplying electric energy to the multilevel conversion circuit after the multilevel conversion circuit normally operates. Moreover, the at least one first auxiliary power supply is coupled to the output end of the rectifier circuit and acts as an auxiliary power supply independent of the multilevel conversion circuit. The at least one first auxiliary power supply has a smaller output power mainly for supplying electric energy to the controller when the flying capacitor and the DC bus capacitor are in charging process and when the multilevel conversion circuit occurs a fault. Furthermore, the charging loops for the flying capacitor and the DC bus capacitor also can be cut off in a fault state, and the first current limiting circuit works actively after the fault is resolved, thereby improving fault response capability of the multilevel conversion circuit.

In conclusion, as for the multilevel conversion circuit having a flying capacitor provided in the application, as compared to the conventional technical solution, application requirements of the three-level to n-level conversion circuits can be satisfied by only adding a simple rectifier circuit. The respective embodiments are only to explain the disclosure, and the structures, configurations and corresponding modulation methods of the respective circuits can be modified. On the basis of the technical solution of the application, any modifications and equivalent alternations of the individual circuit based on the principle of the disclosure shall not be excluded from the scope protected by the invention.

Exemplary embodiments of the invention have been shown and described in details. It shall be understood that the invention is not limited to the disclosed embodiments. Instead, the invention intends to cover various modifications and equivalent settings included in the spirit and scope of the appended claims.

What is claimed is:

1. A multilevel conversion circuit having a flying capacitor, comprising:
   a first bridge arm comprising a plurality of switches connected in series;
   a second bridge arm comprising a plurality of switches connected in series and the flying capacitor, wherein a midpoint of the second bridge arm and a midpoint of the first bridge arm are connected to a first series branch, wherein the first series branch is defined by a first current limiting circuit, a power supply and an inductor;
   a DC bus capacitor connected in parallel to the first bridge arm and the second bridge arm;
   a rectifier circuit having an input end coupled to the power supply;
   a first auxiliary power supply having an input end coupled to an output end of the rectifier circuit; and
   a controller coupled to the first auxiliary power supply and the plurality of switches of the second bridge arm;
   wherein after the controller is activated, the controller is configured to control the corresponding switches of the second bridge arm to turn on, and the power supply charges the flying capacitor through the corresponding switches of the first bridge arm, the corresponding switches of the second bridge arm and the first current limiting circuit.

2. The multilevel conversion circuit according to claim 1, wherein before the controller is activated, an initial voltage of the flying capacitor and an initial voltage of the DC bus capacitor are zero.

3. The multilevel conversion circuit according to claim 1, wherein the input end of the first auxiliary power supply is connected in parallel to the DC bus capacitor through a diode.

4. The multilevel conversion circuit according to claim 1, wherein when a voltage of the DC bus capacitor is greater than an output voltage of the rectifier circuit, the first auxiliary power supply is powered by the DC bus capacitor.

5. The multilevel conversion circuit according to claim 1, further comprising a second auxiliary power supply having an input end connected in parallel to the DC bus capacitor.

6. The multilevel conversion circuit according to claim 5, wherein an output power of the second auxiliary power supply is higher than an output power of the first auxiliary power supply.

7. The multilevel conversion circuit according to claim 1, wherein after the controller is activated and before the first current limiting circuit is conducted, the controller is configured to control the corresponding switches of the second bridge arm to turn on.

8. The multilevel conversion circuit according to claim 1, wherein the power supply charges the DC bus capacitor through the corresponding switches of the first bridge arm, the corresponding switches of the second bridge arm and the first current limiting circuit.

9. The multilevel conversion circuit according to claim 1, further comprising a third bridge arm comprising a plurality of switches connected in series; wherein the third bridge arm is connected in parallel to the first bridge arm, and a midpoint of the third bridge arm is connected to the first series branch;
   wherein after the controller is activated, the power supply charges the flying capacitor through the corresponding switches of the second bridge arm, the corresponding switches of the first bridge arm, the first current limiting circuit and the corresponding switches of the third bridge arm.

10. The multilevel conversion circuit according to claim 9, wherein the power supply charges the DC bus capacitor through the corresponding switches of the first bridge arm, the corresponding switches of the second bridge arm and the first current limiting circuit; and/or the power supply charges the DC bus capacitor through the corresponding switches of the first bridge arm, the first current limiting circuit and the corresponding switches of the third bridge arm.

11. The multilevel conversion circuit according to claim 1, wherein the multilevel conversion circuit is a three-level conversion circuit, and the second bridge arm comprises a first switching device, a second switching device, a third switching device and a fourth switching device, and the first switching device to the fourth switching device are connected in series; the flying capacitor is connected between the first switching device and the fourth switching device.

12. The multilevel conversion circuit according to claim 11, wherein when a voltage of the flying capacitor reaches a first preset value, the flying capacitor completes charging;
   the controller is configured to control the corresponding switches of the second bridge arm to turn off, and the power supply continues to charge the DC bus capacitor;
   when a voltage of the DC bus capacitor reaches a second preset value, the DC bus capacitor completes charging.

13. The multilevel conversion circuit according to claim 12, wherein the first preset value is a half of the second preset value.

14. The multilevel conversion circuit according to claim 1, wherein the multilevel conversion circuit is a n-level conversion circuit, where n is a positive integer greater than 3;
   the second bridge arm comprises $(2n-2)$ switches connected in series and $(n-2)$ flying capacitors, wherein the i-th flying capacitor is connected between the i-th switching device and the $(2n-1-i)$th switching device of the second bridge arm, where $i=1, 2, \ldots, n-2$.

15. The multilevel conversion circuit according to claim 14, wherein when a voltage of the i-th flying capacitor reaches $(n-1-i)/(n-1)$ times of a second preset value, the i-th flying capacitor completes charging, and the controller is configured to control the corresponding switches of the second bridge arm to turn off, when all of the $(n-2)$ flying capacitors complete charging, the power supply continues to charge the DC bus capacitor;
   when a voltage of the DC bus capacitor reaches the second preset value, the DC bus capacitor completes charging.

16. The multilevel conversion circuit according to claim 1, wherein the first current limiting circuit comprises a first switch, a second switch and a soft-start resistor, and the first switch and the soft-start resistor are connected in series to form a second series branch, and the second switch and the second series branch are connected in parallel.

17. The multilevel conversion circuit according to claim 16,
wherein before the controller is activated, both the first switch and the second switch are turned off, after the controller controls the corresponding switches of the second bridge arm to turn on, the first switch is turned on, and the power supply charges the flying capacitor through the corresponding switches of the first bridge arm, the corresponding switches of the second bridge arm and the soft-start resistor.

18. The multilevel conversion circuit according to claim 16, wherein after the first switch is turned on, the controller controls the corresponding switches of the second bridge arm to turn on, and the power supply charges the flying capacitor through the corresponding switches of the first bridge arm, the corresponding switches of the second bridge arm and the soft-start resistor.

19. The multilevel conversion circuit according to claim 1, further comprising a second current limiting circuit coupled between the power supply and the rectifier circuit; wherein the second current limiting circuit comprises a third switch and a current limiting resistor connected in parallel.

20. The multilevel conversion circuit according to claim 19, wherein before the controller is activated, the third switch is turned off, and the power supply powers the first auxiliary power supply through the current limiting resistor and the rectifier circuit.

21. The multilevel conversion circuit according to claim 19, wherein after the controller is activated, the third switch is turned on, and the power supply powers the first auxiliary power supply through the third switch and the rectifier circuit.

22. The multilevel conversion circuit according to claim 16, wherein when the multilevel conversion circuit occurs a fault, the first switch and the second switch are turned off.

23. The multilevel conversion circuit according to claim 16, wherein when a voltage of the DC bus capacitor reaches a second preset value, the controller is configured to control all switches of the second bridge arm to turn off, the second switch to turn on, and the first switch to turn off.

24. The multilevel conversion circuit according to claim 19, wherein when the multilevel conversion circuit occurs a fault, the third switch is turned off.

* * * * *